US012792431B2

(12) United States Patent
Podany

(10) Patent No.: US 12,792,431 B2
(45) Date of Patent: Nov. 10, 2026

(54) SYSTEMS, METHODS, AND MEDIA FOR GENERATING AND UTILIZING AN INTERACTIVE DIRECTED GRAPH REPRESENTING AN MQ ENVIRONMENT

(71) Applicant: FMR LLC, Boston, MA (US)

(72) Inventor: Ryan Alexander Podany, McKinney, TX (US)

(73) Assignee: FMR LLC, Boston, MA (US)

( * ) Notice: Subject to any disclaimer, the term of this patent is extended or adjusted under 35 U.S.C. 154(b) by 398 days.

(21) Appl. No.: 18/387,943

(22) Filed: Nov. 8, 2023

(65) Prior Publication Data

US 2025/0147825 A1 May 8, 2025

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS 10,200,387 B2 2/2019 Muthukrishnan et al.
2004/0039728 A1* 2/2004 Fenlon ................ H04L 41/0681
2014/0019879 A1* 1/2014 Krajec .................. G06F 3/0481 715/753
2014/0189651 A1* 7/2014 Gounares ............ G06F 11/3636 717/125
2016/0308712 A1* 10/2016 Azriel ...................... H04L 67/51
2016/0378615 A1* 12/2016 Cohen ..................... G06F 11/00 714/19
2017/0285923 A1* 10/2017 Giral ................... H04L 41/5058
2018/0121032 A1* 5/2018 Naous ................... G06F 3/0482
2022/0239554 A1* 7/2022 Mishra .................... H04L 41/12
2023/0065398 A1* 3/2023 Purdy ................. H04L 63/1433
2024/0168734 A1* 5/2024 Bailey ................. G06F 11/3466

* cited by examiner

*Primary Examiner* — Mustafa A Amin
(74) *Attorney, Agent, or Firm* — Cesari and McKenna, LLP; Omar M. Wadhwa

(57) ABSTRACT

Techniques are provided for generating and utilizing an interactive directed graph representing a messaging queue (MQ) environment. A plurality of text files, each corresponding to a different queue manager of the MQ environment may be analyzed. Based on the analysis, (1) each queue manager and the objects managed by the queue manager may be identified and (2) the relationships between the objects of the MQ environment may be identified. An interactive directed graph, representing the MQ environment, can be generated to include a different node for each identified object and an edge for each identified relationship. The interactive directed graph can provide a pictorial representation for the flow of data through the entire MQ environment. The interactive directed graph can be analyzed and searched to (1) identify a portion that includes one or more objects of interest and/or (2) identify a problem in the MQ environment and remediate the problem.

15 Claims, 13 Drawing Sheets

SYSTEMS, METHODS, AND MEDIA FOR GENERATING AND UTILIZING AN INTERACTIVE DIRECTED GRAPH REPRESENTING AN MQ ENVIRONMENT

BACKGROUND

Technical Field

The present disclosure relates generally to a messaging queue architecture, and more specifically to techniques for generating and utilizing an interactive directed graph representing a messaging queue environment.

Background Information

In modern computing, applications are often decoupled into smaller, independent building blocks that are easier to develop, deploy, and maintain. A messaging queue environment uses message queues that allow these distributed applications to communicate. Using a messaging queue environment can significantly simplify coding of decoupled applications, while improving performance, reliability, and scalability.

A messaging queue is a form of middleware that allows for asynchronous communication between applications. To that end, a message queue provides a lightweight buffer that temporarily stores messages, and endpoints that allow the applications (i.e., software components) to connect to the queues in order to send and receive messages. The messages may include, but are not limited to, requests, replies, error messages, signals, metadata, or any type of information. To send a message, a component, such as a producer application, adds or provides a message to a messaging queue in the messaging queue environment. The message is stored on the messaging queue until another component, such as a consumer application, retrieves the message to perform a desired action.

Two common types of messaging in a messaging queue environment are point-to-point messaging and publish-and-subscribe messaging. Point-to-point messaging occurs between two discrete components (e.g., applications) that share responsibility for a given task. The producer application needs to know the details regarding the consumer application so that messages can reach the consumer application. Publish-and-subscribe messaging decouples the provider application from the consumer application. With publish-and-subscribe messaging, neither the producer application nor the consumer application need to know information about the other and messages may be sent to all subscribers (e.g., a group of consumer applications) at the same time.

Queue managers are the control-plane components in a messaging queue environment. Each queue manager may manage one or more messaging queue objects and specify the details associated with the operation of its managed messaging queue objects. Such details may include, but are not limited to, which messages receive priority, necessary types of responses, where to store and process messages, etc.

Typically, messaging queue environments are complex systems that include many queue managers and many managed objects, where the queue managers are responsible for ensuring that the messages arrive at the correct location. Because of the complexity and large size of messaging queue environments, identifying and then remediating errors or problems can be difficult and time consuming. As a result, disruption in messaging queue services are encountered, which can consume processing and storage resources, until a user is able to manually identify and fix the errors/problems.

Therefore, what is needed is a technique that more easily and efficiently identifies and remediates errors/problems in a messaging queue environment to avoid or mitigate a disruption in services.

SUMMARY

Techniques are provided for generating and utilizing an interactive directed graph representing a messaging queue (MQ) computer environment. As will be described in further detail below, the generation and utilization of the interactive directed graph results in identifying and remediating errors/problems in an MQ computer environment more easily and efficiently when compared to conventional systems.

In an embodiment, a software module (e.g., an MQ module) executed by a processor may analyze one or more definition objects corresponding to a plurality of different MQ objects that each perform one or more different messaging functions in an MQ computer environment. For example, the software module may analyze each text file, which includes one or more definition objects, which is generated for each queue manager of the MQ environment.

Based on the analysis, the software module may identify an MQ object type for each object of the MQ computer environment. For example, the software module may analyze each text file and identify all the queue managers and their managed objects. The software module may also identify one or more relationships between the plurality of MQ objects of the MQ environment. Therefore, and based on the analysis as described herein, the software module can identify all the MQ objects of the MQ computer environment and their relationships to determine the manner in which data flows in the MQ computer environment.

The software module may generate an interactive directed graph, representing the MQ computer environment, using the identified MQ objects, each having a type, and the identified relationships. In an embodiment, the software module may generate a graphical node for each identified object. The software module may generate a different graphical depiction for each MQ object type or may generate the same graphical depiction for two or more MQ object types. For example, the software module may generate a square/cube for each queue manager identified in the MQ computer environment. As another example, the software module may generate a circle for server connection channels, local queues (e.g., shared and non-shared queue), etc.

Additionally, the software module may generate an edge for each relationship identified between MQ objects of the MQ computer environment. In an embodiment, the edge may include an arrow to indicate a direction flow of messages. Therefore, the software module may generate (1) a different node for each MQ object identified from the analysis of the text files corresponding to the MQ computer environment and (2) a different edge for each relationship (e.g., direct relationship) identified from the analysis of the text files corresponding to the MQ computer environment.

In an embodiment, generating the interactive directed graph may include the software module determining a location for each node and each edge on the interactive determined based on the plurality of different MQ objects in the MQ computer environment and the identified relationships.

In an embodiment, the software module can utilize a graph algorithm to determine the locations on the interactive directed graph. The graph algorithm can utilize a plurality of different criteria for determining a location for each of the generated nodes and edges on the interactive directed graph. The criteria may include, but is not limited to, the size of each of the generated graphical nodes, the number of the generated graphical nodes, the size and/or number of the existing generated graphical nodes and/or edges on the interactive directed graph, a size of the overall interactive directed graph when maximized and/or minimized on a computer display, spatial requirements between nodes and/or edges on the interactive directed graph, etc. In an embodiment, the software module implements NetworkX, a package for the Python program language, as the graph algorithm to determine a location for each generated node and edge.

Therefore, the software module can generate an interactive directed graph of an entire MQ environment. As such, the interactive directed graph, generated according to the one or more embodiments as described herein, can provide a complete pictorial representation of the MQ environment and the manner in which data flows through the MQ environment.

Because the visual representation of a real-world MQ environment may be complex and densely populated with nodes and edges, the interactive directed graph according to the one or more embodiments as described herein can be manipulated and searched to focus on a portion of interest. For example, the portion of interest of the MQ environment may be investigated to identify a location and/or objects in the MQ computer environment that have caused or are related to a disruption in service (e.g., errors, messages not being transmitted, bottleneck traffic, etc.). Therefore, the interactive directed graph of the MQ environment may be used and analyzed to take one or more actions to avoid or remediate a disruption in service in the MQ computer environment.

To that end, the software module can analyze and search the interactive directed graph representing the MQ computer environment to identify a portion of the interactive directed graph that includes one or more MQ objects of interest. In an embodiment, the software module may automatically analyze and search the interactive directed graph based on the analysis of real-world data corresponding to the MQ computer environment. In addition or alternatively, the software module may analyze and search the interactive directed graph based on user input.

The software module may output a portion of the interactive directed graph that includes the one or more MQ objects of interest and one or more other MQ objects that have direct and/or indirect relationships to the one or more MQ objects of interest. Based on an analysis of the portion of the interactive directed graph and/or user input, a problem corresponding to the MQ computer environment may be identified and one or more actions can be taken to remediate the identified problem. As a result, a disruption in MQ messaging services can be avoided or mitigated more efficiently when compared to conventional systems that require the a manual investigation and remediation of the complex and large MQ computer environment.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
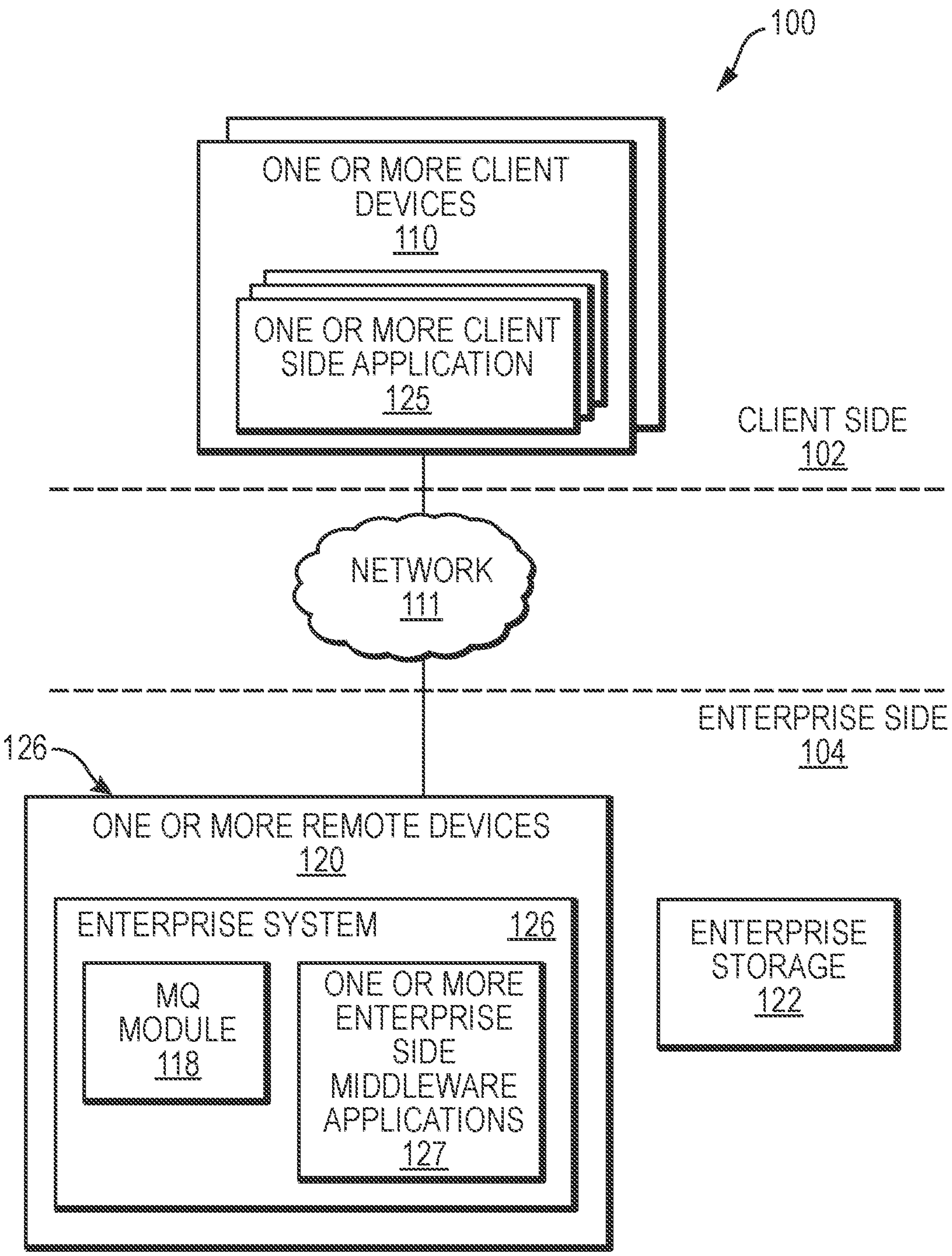
FIG. 1 is a high-level block diagram of an example system environment for generating and utilizing an interactive directed graph representing a messaging queue (MQ) environment according to one or more embodiments as described herein.

FIG. 1 is a high-level block diagram of an example system environment 100 for generating and utilizing an interactive directed graph representing a messaging queue (MQ) environment according to one or more embodiments as described herein. The system environment 100 may be divided into a client side 102 that includes one or more local client devices 110 that are local to end users, and an enterprise side 104 that includes one or more remote devices 120. Enterprise side 104 may be managed, operated, and maintained by an enterprise. In an embodiment, the enterprise of enterprise side 104 may be a financial services institution. It is expressly contemplated that the one or more embodiments as described herein are applicable to any of a variety of different types of enterprise systems that may be managed, operated, and/or maintained by any of a variety of different types of enterprises that may provide any types of services. As such, the reference herein to a financial services institution that provides financial services functions is for illustrative purposes only.

The client side 102 may include one or more local client devices 110 that provide a variety of user interfaces and non-processing intensive functions. For example, a local client device 110 may provide a user interface for receiving user input and displaying output according to the one or more embodiments as described herein. The user interface can be a graphical user interface or a command line interface. In an embodiment, the client device 110 may be a server, a workstation, a platform, a mobile device, a network host, or any other type of computing device. The client device 110 may be operated by, for example, customers of the enterprise. Client device 110 may also be operated by authorized personnel, e.g., employees of the enterprise, to perform enterprise functions. Client device 110 may download and execute one or more client side applications 125. In an embodiment, the execution of application 125 may allow customers and/or employees of the enterprise to implement one or more financial services functions.

The client device 110 may communicate with the enterprise system 126, managed/operated by the enterprise, over network 111. For example, a user may utilize application 125, executing on client device 110, to perform one or more functions at enterprise system 126 as will be described in further detail below.

Enterprise side 104 includes enterprise storage 122 that may store one or more objects, data structures, etc. that may be generated or utilized according to the one or more embodiments as described herein. For example, enterprise storage 122 may store one or more definition objects each of which may include information for a different object in an MQ environment. In an embodiment, enterprise storage 122 may be one or more of (1) one or more databases (e.g., relational databases), hard disk drives (HDDs), and/or sold state drives (SSDs).

The enterprise side 104 also includes one or more remote devices 120 that may be one or more cloud-based devices and/or one or more server devices. The one or more remote devices 120 may store and execute enterprise system 126 that may implement the one or more embodiments as described herein. The enterprise system 126 may be accessible to its customers and/or authorized personnel, e.g., employees of the enterprise.

The enterprise system 126 includes one or more enterprise side middleware applications 127 and MQ module 118. In an embodiment, the one or more enterprise side middleware applications 127 may implement one or more financial services functions. In an embodiment, the enterprise system 126 may implement an MQ environment (i.e., MQ architecture) for the enterprise such that two or more applications (e.g., client side applications 125 and/or enterprise side applications 126) may communicate asynchronously. For example, an application (e.g., client side application 125 or an enterprise side application 126) may send and/or receive messages to a different application (e.g., client side application 125 or an enterprise side application 126) using one or more queues that are managed by one or more queue managers. In an embodiment, the MQ architecture implemented by the enterprise system 126 is IBM® WebSphere® offered by IBM of Armonk, NY.

The MQ module 118 may implement one or more embodiments as described herein. In an embodiment, only authorized personnel of the enterprise can execute the MQ module 118 to implement the one or more embodiments as described herein. For example, authorized personnel of the enterprise may utilize client device 110 to execute MQ module 118 to implement one or more embodiments as described herein.

As will be described in further detail below, the MQ module 118 may analyze the different definition objects that correspond to the MQ objects of the MQ environment. Based on the analysis, the MQ module 118 may generate an interactive directed graph representing the MQ environment. The interactive directed graph may include nodes representing the MQ objects. Additionally, the interactive directed graph may include edges that represent the relationships between the MQ objects and the flow of data in the MQ environment. Further, and as will be described in further detail below, the MQ module 118 may be utilized to identify and/or remediate a problem with the MQ environment to prevent or reduce the disruption of MQ services. Therefore, the interactive directed graph can be utilized to, for example, understand the MQ architecture at a finer granularity when compared to conventional systems.

Figure 2:
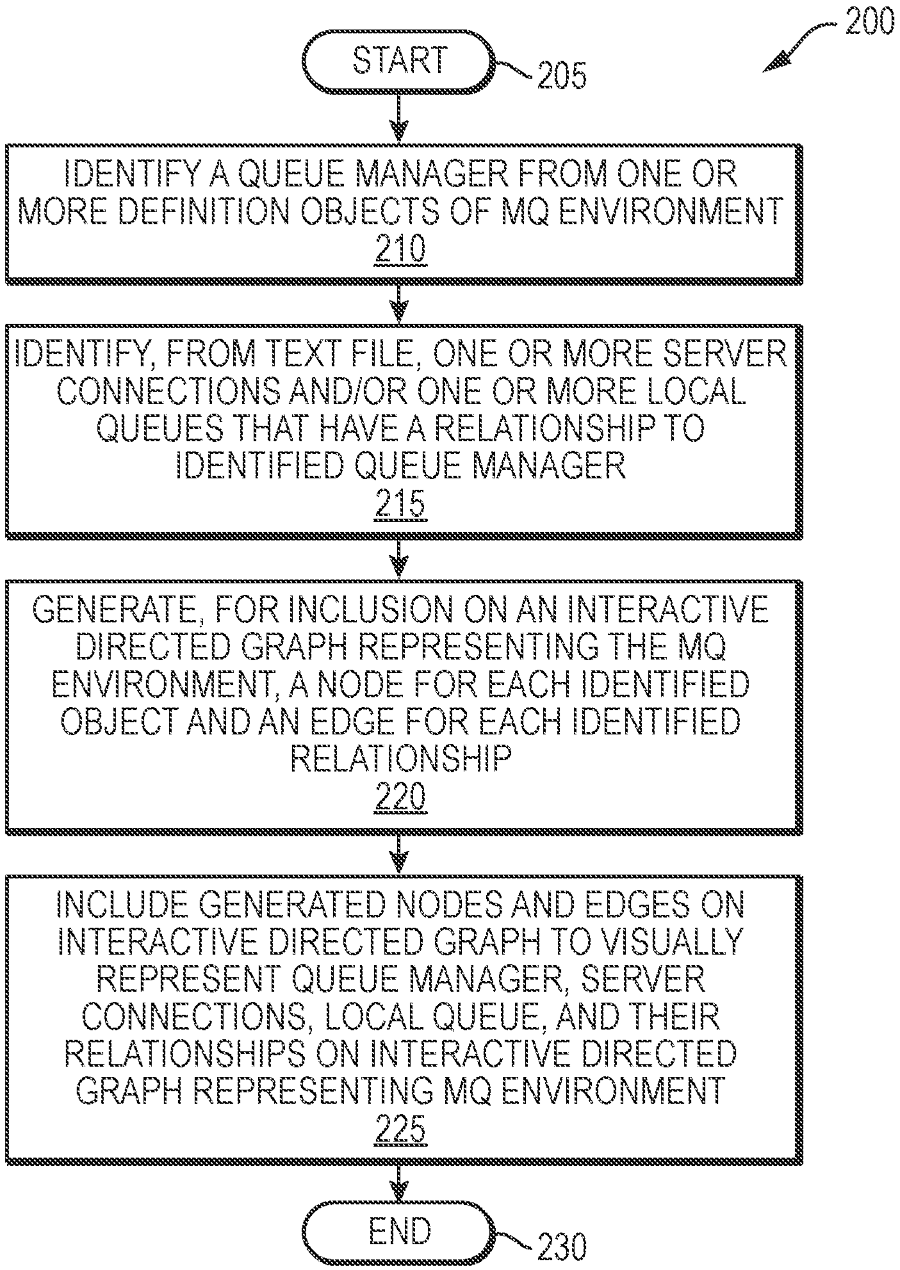
FIG. 2 is a flow diagram of a sequence of steps for generating, for an interactive directed graph, nodes and edges for a queue manager, server connection channels and a non-shared queue, e.g., local queue, of an MQ environment according to the one or more embodiments as described herein.
Figure 5:
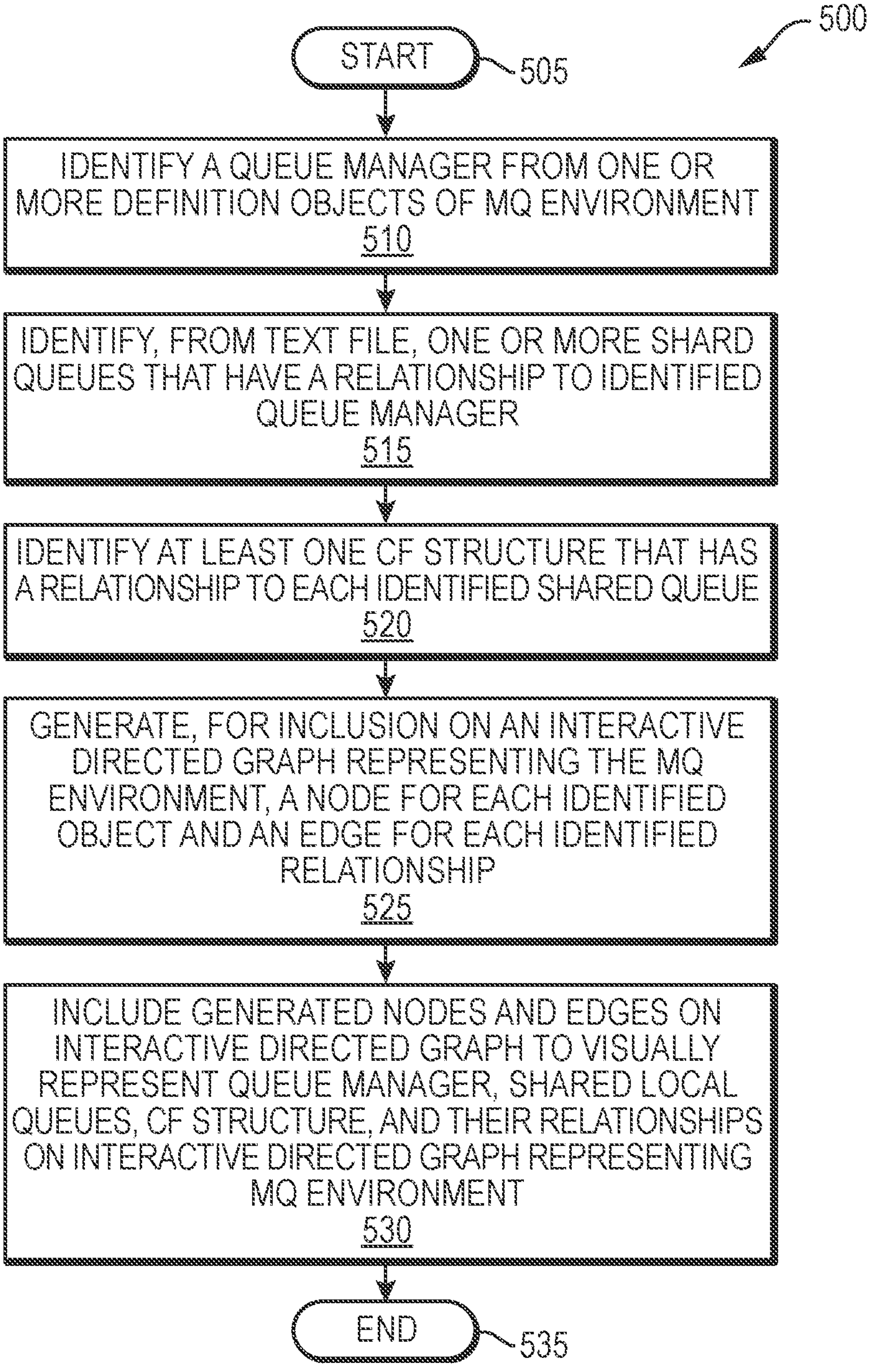
FIG. 5 is a flow diagram of a sequence of steps for generating, for an interactive directed graph, nodes and edges for a queue manager, shared queues, and a coupling facility (CF) structure of an MQ environment according to the one or more embodiments as described herein.
Figure 8:
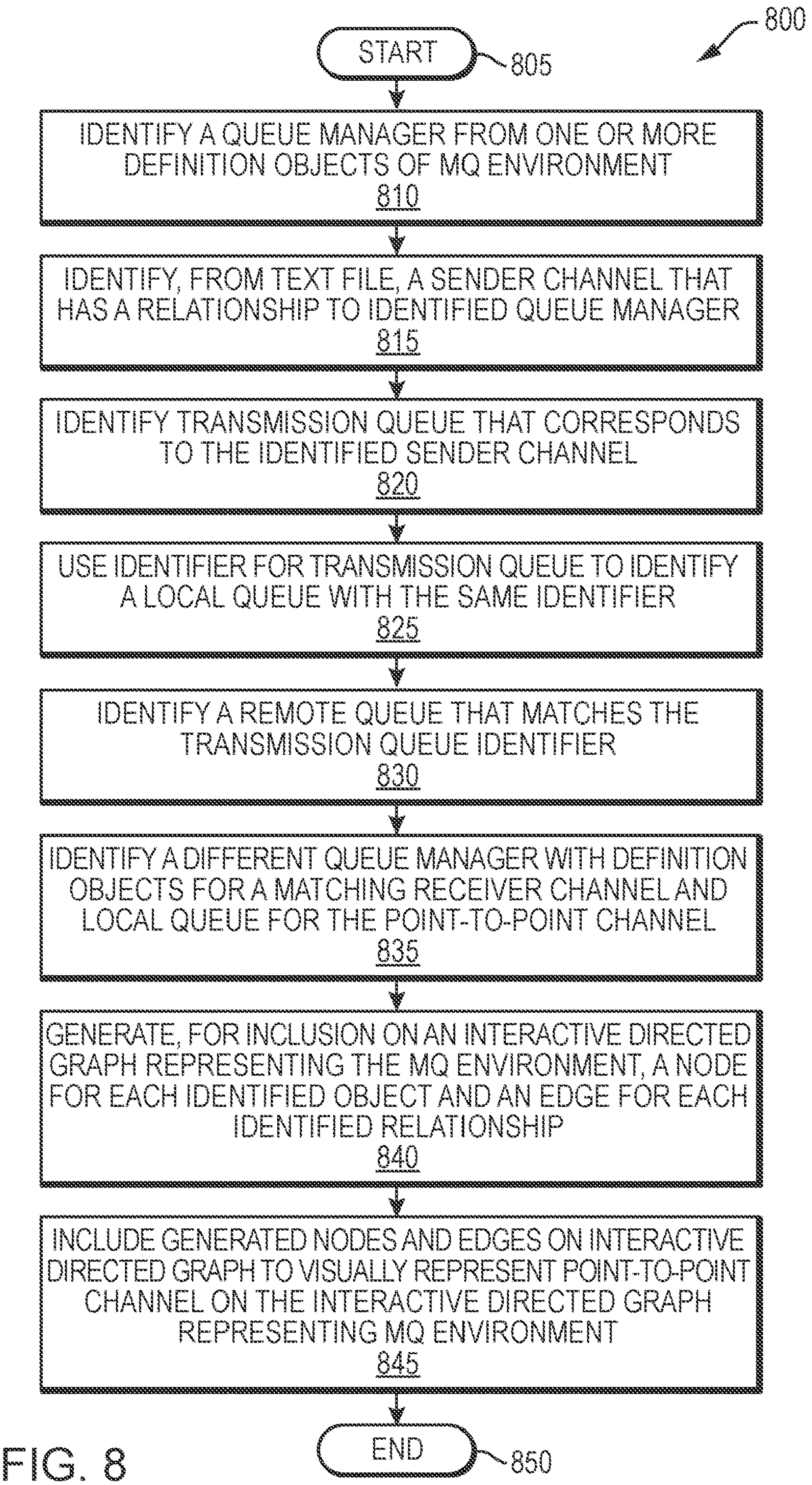
FIG. 8 is a flow diagram of a sequence of steps for generating, for an interactive directed graph, nodes and edges for a point-to-point channel of an MQ environment according to the one or more embodiments as described herein.

The flow diagrams of FIGS. 2, 5, and 8 describe generating nodes and edges for particular types of MQ objects and particular identified relationships. However, it is expressly contemplated that the one or more embodiments as described herein may generate nodes and edges for any of a variety of different nodes and relationships of an MQ architecture in a similar manner as described herein.

FIG. 2 is a flow diagram of a sequence of steps for generating, for an interactive directed graph, nodes and edges for a queue manager, server connection channels and a non-shared queue, e.g., local queue, of an MQ environment according to the one or more embodiments as described herein.

The procedure 200 starts at step 205 and continues to step 210 where the MQ module 118 identifies a queue manager from one or more definition objects for an MQ environment. In an embodiment, a queue manager is a system program that can provide queuing services to applications (e.g., client side applications 125 and/or enterprise side applications 126). The queue manager may be an MQ object that may provide an application programming interface so that applications can put messages on, and get messages from, queues. A queue manager may ensure that messages are sent to the correct location. In an embodiment, a queue manager may be an MQ object that manages, i.e., hosts, one or more other MQ objects of the MQ environment. For example, such other MQ objects may include, but are not limited to, queues (e.g., local non-shared queue, local shared queue, transmit queue, sender queue, alias queue, etc.), channels (e.g., server connection channel, point-to-point channel, etc.), clusters, etc.

In an embodiment, the enterprise system 126 may execute a make definition tool to generate one or more definition objects for the MQ objects of the MQ environment. In an embodiment, the execution of the make definition tool generates a text file (i.e., plain text format) for each queue manager of the MQ environment. Each text file may include an identifier of the queue manager for which it was generated and one or more definition objects that define the MQ objects managed by the queue manager. In an embodiment, the definition objects for the MQ environment may be linked and organized in a hierarchy. For example, a definition object for a queue manager may be considered as a root node of a hierarchy and the definition objects for the MQ objects managed by the queue manager may be linked to the root node and may be at nodes located at a lower level in relation to the root node.

Figure 3:
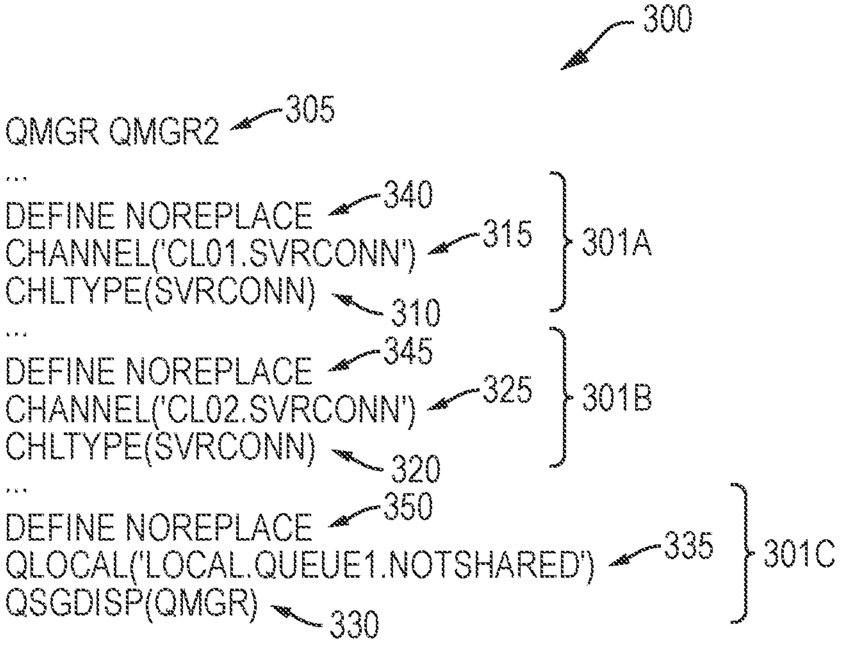
FIG. 3 is an illustration of an example text file, for a queue manager, which includes definition objects for two server connections channels and a local queue that are managed by the queue manager according to the one or more embodiments as described herein.

FIG. 3 is an illustration of an example text file 300, for a queue manager, which includes definition objects for two server connection channels and a local queue that are managed by the queue manager according to the one or more embodiments as described herein.

In an embodiment, a server connection channel is a bidirectional MQ interface that can be used to connect an MQ client to an MQ server. The server connection channel may be the server end of the channel. In an embodiment, a non-shared queue is a local queue whose messages can be accessed by only one queue manager. In contrast, a shared queue is a local queue whose messages can be accessed by one or more queue managers.

Although FIG. 3 illustrates single text file 300 including the definition objects for all of the MQ objects managed by a queue manager, it is expressly contemplated that each definition object for a different MQ object managed by a queue manager may be included in a separate text file. In this alternative embodiment, each of the text files for each of the different MQ objects would include an identifier for its queue manager. Further, although the text file 300 of FIG. 3 includes particular lines of text, it is expressly contemplated that the text file 300 may include additional lines of text for each of the managed MQ objects. That is, particular lines of text have been excluded from text file 300 for clarity and ease of understanding. As such, it should be expressly understood that the text included in text file 300 of FIG. 3 is for illustrative purposes only.

To identify a particular queue manager, the MQ module 118 may access and analyze text file 300 to identify a particular parameter field that corresponds to a queue manager identifier. For this example, let it be assumed that the parameter field is QMGR. As such, the MQ module 118 may syntactically analyze text file 300 to identify QMGR at line 305 of text file 300. The MQ module 118 may determine that the identifier that follows QMGR at line 305 is the identifier for the queue manager for which text file 300 was generated. Therefore, and in this example, MQ module 118 determines that QMGR2 is the identifier, e.g., name, of the queue manager for which text file 300 is generated. In an embodiment, line 305 along with other text lines (not shown) of text file 300 that describe queue manager QMGR2 may be referred to as a definition object for queue manager QMGR2.

The procedure continues from step 210 to step 215 and the MQ module 118 identifies, from the text file, one or more server connection channels and/or one or more local queues that have a relationship to the identified queue manager. In an embodiment, the MQ module 118 may determine that the text of text file 300 that follows the queue manager identifier at line 305 corresponds to definition objects of the MQ objects that are managed by the queue manager. Therefore, and in this example, the MQ module 118 determines that the text that follows, e.g., which is below, the queue manager identifier of QMGR2 at line 305 corresponds to definition objects for the MQ objects of the MQ architecture that are managed by queue manager QMGR2.

In this example, text file 300 includes definition object 301A for a server connection channel managed by queue manager QMGR2, definition object 301B for a different server connection channel managed by queue manager QMGR2, and definition object 301C for a non-shared queue managed by queue manager QMGR2. For ease of understanding, the definition objects 301A, 301B, and 301C are offset by ellipses in FIG. 3.

According to the one or more embodiments as described herein, the MQ module 118 may identify a server connection channel or non-shared queue (e.g., local queue), which is managed by queue manager QMGR2 based on one or more parameters included in text file 300.

In this example and based on the analysis of the text of text file 300 that follows line 305, the MQ module 118 may identify parameter field CHLTYPE at line 310 of definition object 301A. Parameter field CHLTYPE may indicate a channel type that is managed by queue manager QMGR2. In this example, the MQ module 118 may syntactically identify SVRCONN that is enclosed within parentheses and that follows parameter field CHLTYPE at line 310. Based on the identification of SVRCONN in relation to parameter field CHLTYPE at line 310, the MQ module 118 may determine that queue manager QMGR2 manages a server connection channel.

Additionally, the MQ module 118 may syntactically identify parameter field CHANNEL at line 315 of definition object 301A. Parameter field CHANNEL at line 315 may indicate an identifier of the channel type at line 310. That is, the parameter field CHANNEL at line 315 may indicate that the identifier at line 315 is an identifier for the MQ object type identified at the next text line of the definition object 301A. Therefore, the MQ module 118 may syntactically identify CL01.SVRCONN that follows parameter field CHANNEL and that is also enclosed in parentheses and single quotations at line 315. Based on the identification of CL01.SVRCONN in relation to parameter field CHANNEL at line 315, the MQ module 118 may determine that the identifier of the server connection channel, identified at line 310 and managed by queue manager QMGR2, is CL01.SVRCONN.

Based on the identification of CL02.SVRCONN in relation to parameter field CHANNEL at line 325 of definition object 301B, the MQ module 118 may similarly determine that the identifier of the server connection channel, identified at line 320 and managed by queue manager QMGR2, is CL02.SVRCONN.

Additionally, and based on the analysis of the text of definition object 301C, the MQ module 118 may syntactically identify parameter field QSGDISP (QMGR) at line 330. Based on the identification of QSGDISP (QMGR) at line 330 of definition object 301C, the MQ module 118 may determine that a non-shared queue, e.g., a local queue, is managed by queue manager QMGR2.

Additionally, the MQ module 118 may syntactically identify parameter field QLOCAL at line 335 of definition object 301C. Parameter field QLOCAL at line 335 may indicate an identifier of the non-shared queue identified at line 330 of definition object 301C. That is, the parameter field QLOCAL at line 335 may indicate that the identifier at line 335 is an identifier for the queue type identified at the next line of text of the definition object 301C. Therefore, the MQ module 118 may syntactically identify LOCAL.QUEUE1.NOTSHARED that follows parameter field QLOCAL and that is also enclosed in parentheses and single quotations at line 335 of definition object 301C. Based on the identification of LOCAL.QUEUE1.NOTSHARED in relation to parameter field QLOCAL at line 335, the MQ module 118 may determine that the identifier of the non-shared queue, identified at line 330 and managed by queue manager QMGR2, is LOCAL.QUEUE1.NOTSHARED.

Therefore, and in this example, the MQ module 118 determines from text file 300 that there are two server connection channels and a non-shared queue that are managed by queue manager QMGR2. Further, the MQ module 118 determines from text file 300 that the names or identifiers for the two server connections, which are managed by queue manager QMGR2, are CL01.SVRCONN and CL02.SVRCONN. Similarly, the QM module 118 determines from text file 300 that the name of the non-shared queue, which is managed by queue manager QMGR2, is LOCAL.QUEUE1.NOTSHARED.

Therefore, the MQ module 118 determines that there is a queue manager to server connection channel relationship between queue manager QMGR2 and server connection channel CL01.SVRCONN. Further, the MQ module 118 determines that there is a queue manager to server connection channel relationship between queue manager QMGR2 and server connection channel CL02.SVRCONN. Moreover, the MQ module 118 determines that there is queue manager to non-shared queue between queue manager QMGR2 and queue LOCAL.QUEUE1.NOTSHARED.

The DEFINE NO REPLACE at lines 340, 345, and 350 of text file 300 may indicate that the definitions for the two server connection channels and non-shared queue must not replace any existing definitions for the two server connection channels and non-shared queue.

The procedure continues to step 220 and the MQ module 118 generates, for inclusion on an interactive directed graph representing the MQ environment, a node for each identified MQ object and an edge for each identified relationship. In an embodiment, the MQ module 118 may generate a graphical depiction of a node for each of the identified MQ objects. Additionally, the MQ module 118 may generate a graphical depiction of an edge for each identified relationship. In an embodiment, the MQ module 118 may generate a different graphical depiction for each different type of identified MQ object and/or the MQ module 118 may generate a same graphical depiction for different types of identified MQ objects.

In this example, let it be assumed that the MQ module 118 generates a square, i.e., cube, as the graphical depiction for the queue manager. Additionally, let it be assumed that the MQ module 118 generates a circle as the graphical depiction for each server connection channel and the non-shared queue.

In an embodiment, the MQ module 118 may generate an edge with an arrow for the graphical depiction of each determined relationship. In an embodiment, the arrow may indicate the flow of data (e.g., messages). In this example, the data is flowing from the queue manager to each of the server connection channels and the non-shared queue. As such, the MQ module 118 may generate an edge with an arrow that depicts a flow of data from the generated node representing queue manager QMGR2 to the generated node representing server connection channel CL01.SVRCONN. The MQ module 118 may generate an additional edge with an arrow that depicts a flow of data from the generated node representing queue manager QMGR2 to the generated node representing server connection channel CL02.SVRCONN. The MQ module 118 may also generate an additional edge with an arrow that depicts a flow of data from the generated node representing queue manager QMGR2 to the generated node representing the non-shared queue LOCAL.QUEUE1.NOTSHARED. Because there is no direct relationship between the server connection channels and the non-shared queue, an edge is not generated to depict the direct flow of date between the server connection channels and the non-shared queue.

The procedure continues to step 225 and the MQ module 118 includes the generated nodes and edges the an interactive directed graph to visually represent the queue manager, server connection channels, local queue, and their relationships on the interactive directed graph representing the MQ environment. In an embodiment, the MQ module 118 may implement one or more different graph algorithms to determine a location for each of the generated nodes and edges on the interactive directed graph.

In an embodiment, the graph algorithm may utilize a plurality of different criteria for determining a location for each of the generated nodes and edges on the interactive directed graph. The criteria may include, but is not limited to, the size of each of the generated graphical nodes, the number of the generated graphical nodes, the size and/or number of the existing generated graphical nodes and/or edges on the interactive directed graph, a size of the overall interactive directed graph when maximized and/or minimized on a computer display, spatial requirements between nodes and/or edges on the interactive directed graph, etc. In an embodiment, the MQ module 118 may implement NetworkX, a package for the Python program language, as the graph algorithm to determine a location for each generated node and edge.

In an embodiment, the MQ module 118 may include information, e.g., a label identifier, for each of the generated nodes and edges that is included on the interactive directed graph. After generating the interactive directed graph, the procedure then ends at step 230.

Figure 4:
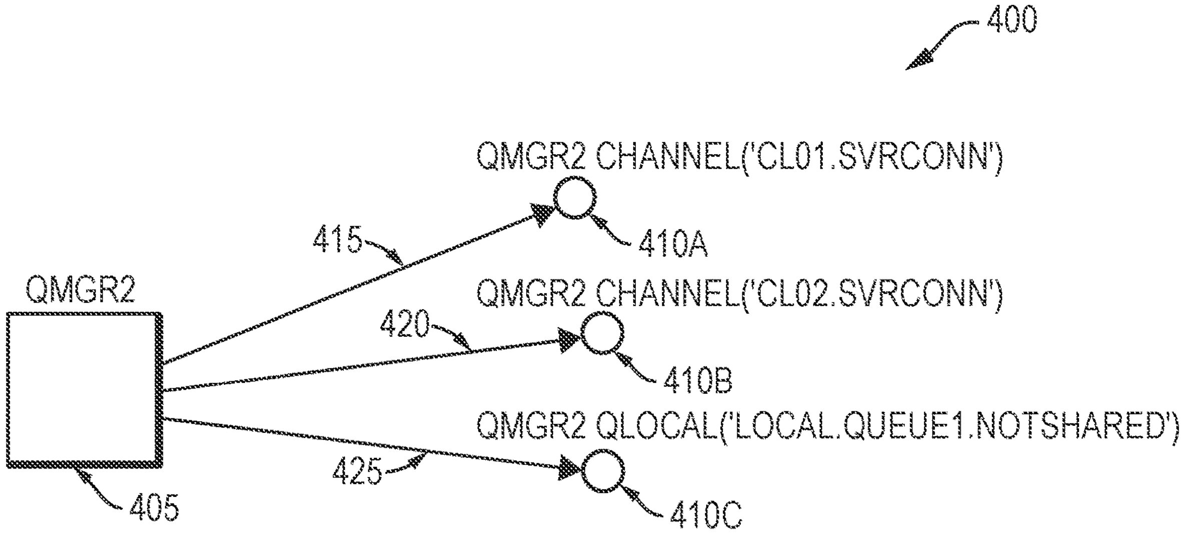
FIG. 4 is an illustration of an example interactive directed graph that can be generated from the text file according to the one or more embodiments as described herein.

FIG. 4 is an illustration of an example interactive directed graph 400 that can be generated from the text file 300 according to the one or more embodiments as described herein. The interactive directed graph 400 may be generated by the MQ module 118 based on the analysis of definition objection 300 as described above.

Interactive directed graph 400 includes node 405 that is a square/cube and that is generated by MQ module 118 to represent queue manager QMGR2. Additionally, interactive directed graph 400 includes nodes 410A, 410B, and 410C that are circles and are generated by MQ module 118 to represent server connection channel CL01.SVRCONN, server connection channel CL02.SVRCONN, and non-shared queue LOCAL.QUEUE1.NOTSHARED, respectively.

Further, interactive directed graph 400 includes edge 415 with an arrow that represents the relationship and flow of data between queue manager QMGR2 and server connection channel CL01.SVRCONN. Specifically, edge 415 with an arrow extends from node 405 that represents queue manager QMGR2 to node 410A that represents server connection channel CL01.SVRCONN. Interactive directed graph 400 also includes edge 420 with an arrow that represents the relationship and flow of data between queue manager QMGR2 and server connection channel CL02.SVRCONN. Specifically, edge 420 with an arrow extends from node 405 that represents queue manager QMGR2 to node 410B that represents server connection channel CL02.SVRCONN. Further, interactive directed graph 400 also includes edge 425 with an arrow that represents the relationship and flow of data between queue manager QMGR2 and non-shared queue LOCAL.QUEUE1.NOTSHARED. Specifically, edge 425 with an arrow extends from node 405 that represents queue manager QMGR2 to node 410C that represents non-shared queue LOCAL.QUEUE1.NOTSHARED. It should be noted that no edge is included between the server connection channels and the non-shared queue because there is no direct relationship between the server connection channels and the non-shared queue in this example. That is, data in the MQ environment does not flow directly from the server connection channels to the non-shared queue.

Interactive directed graph 400 may further include a label, e.g., identifier, for each generated node. For example, and as depicted in FIG. 4, node 405 includes a label QMGR2 indicating that node 405 corresponds to a queue manager that has an identifier of QMGR2. Similarly, node 410A includes a label of QMGR2 CHANNEL ('CL01.SVRCONN') indicating that node 410A corresponds to a channel identified by CL01.SVRCONN that is managed by queue manager QMGR2. Nodes 410B and 410C include similar labels QMGR2 CHANNEL ('CL01.SVRCONN') and QMGR2 QLOCAL ('LOCAL.QUEUE1.NOTSHARED'), respectively.

In an embodiment, the MQ module 118 may utilize a graph algorithm, as described herein, to determine the position and/or size of each of the generated nodes on the interactive directed graph 400. In addition or alternatively, the MQ module 118 may utilize the graph algorithm, as described herein, to determine the position and/or size of each generated edge on the interactive directed graph 400.

As will be described in further detail below, the interactive directed graph that is generated for an MQ environment may be searched and analyzed to efficiently identify and/or remediate a problem in the MQ environment that may, for example, cause a disruption in service.

FIG. 5 is a flow diagram of a sequence of steps for generating, for an interactive directed graph, nodes and edges for a queue manager, shared queues, and a coupling facility (CF) structure of an MQ environment according to the one or more embodiments as described herein. As mentioned above, a shared queue is a local queue whose messages can be accessed by one or more queue managers. For example, a shared queue may share data (e.g., messages) with a single point known as a CF structure, and the CF structure may store the shared data while the data is waiting to be consumed by a plurality of different queue managers.

Figure 6:
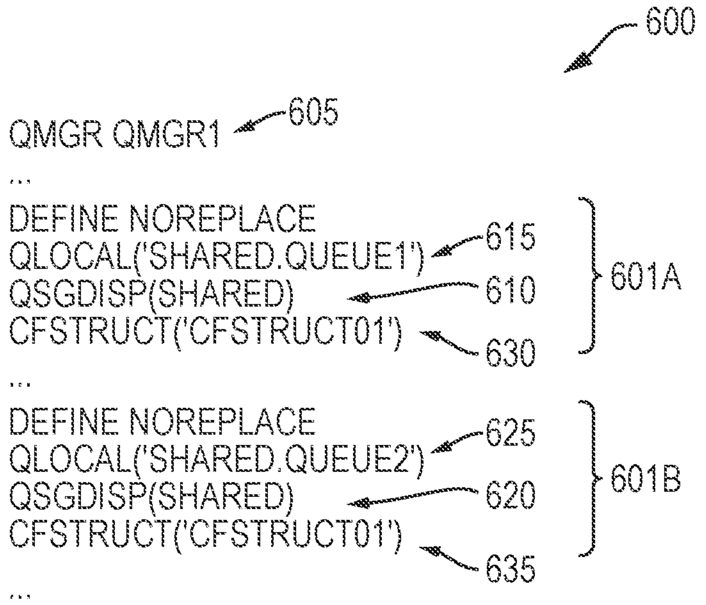
FIG. 6 is an illustration of an example text file, for a queue manager, which includes definition objects for two shared queues and a CF structure according to the one or more embodiments as described herein.

The procedure 500 starts at step 505 and continues to step 510 where the MQ module 118 identifies a queue manager from one or more definition objects of an MQ environment. FIG. 6 is an illustration of an example text file 600, for a queue manager, which includes definition objects for two shared queues and a CF structure according to the one or more embodiments as described herein. The MQ module 118 may identify queue manager QMGR1 at line 605 of text file 600 in a similar manner as described above in relation to step 210 of FIG. 2. Further, text file 600 includes two definition objects 601A and 601B.

The procedure 500 continues to step 515 and the MQ module 118 identifies, from the text file, one or more shared queues that have a relationship to the identified queue manager. The MQ module 118 may identify a shared queue based on one or more parameters included in the text lines of text file 600.

In this example and based on the analysis of text lines of text file 600 that follow line 605, the MQ module 118 may identify parameter field QSDISP (SHARED) at line 610 of definition object 601A. Parameter field QSDISP (SHARED) may indicate that queue manager QMGR1 manages a shared queue.

Additionally, the MQ module 118 may syntactically identify parameter field QLOCAL at line 615 of definition object 601A. Parameter field QLOCAL at line 615 may indicate an identifier of queue type at line 610. That is, the parameter field QLOCAL at line 615 may indicate that the identifier at line 615 is an identifier for the queue type identified at the next line of the text of definition object 601A. Therefore, the MQ module 118 may syntactically identify SHARED.QUEUE1 that follows parameter field QLOCAL and that is also enclosed in parentheses and single quotations at line 615. Based on the identification of SHARED.QUEUE1 in relation to parameter field QLOCAL at line 615, the MQ module 118 may determine that the identifier of the shared queue, identified at line 610 and managed by QMGR1, is SHARED.QUEUE1.

The MQ module may similarly determine, based on lines 620 and 625 of definition object 601B, that queue manager QMGR1 manages a shared queue that is identified by SHARED.QUEUE2.

Therefore, and based on the analysis of text file 600 for queue manager QMGR1, the MQ module 118 can determine that the queue manager QMGR1 manages shared queues SHARED.QUEUE1 and SHARED.QUEUE2.

The procedure continues to step 520 and the MQ module 118 identifies at least one CF structure that has a relationship to each identified shared queue. In this example, the MQ module 118 identifies at least one CF structure for each of shared queues SHARED.QUEUE1 and SHARED-.QUEUE2. According to the one or more embodiments as described herein, the MQ module 118 may identify a CF structure corresponding to a shared queue based on the identification of a particular parameter field that follows parameter field QSDISP (SHARED). In this example, let it be assumed that the particular parameter field is CFSTRUCT. As such, the MQ module 118 may syntactically analyze definition object 601A of text file 600 and determine that CFSTRUCT at line 630 follows QSDISP (SHARED) at line 610.

The MQ module 118 may syntactically identify CFSTRUCT01 that follows parameter field CFSTRUCT and that is also enclosed in parentheses and single quotations at line 630. Based on the identification of CFSTRUCT01 in relation to parameter field CFSTRUCT at line 630, the MQ module 118 may determine that the identifier of the CF structure, corresponding to shared queue SHARED.QUEUE1, is CFSTRUCT01. Based on line 635 of definition object 601B, the MQ module 118 may similarly determine that the identifier of the CF structure, corresponding to shared queue SHARED.QUEUE2, is CFSTRUCT01.

Therefore, the MQ module 118 may determine that there is a queue manager to shared queue relationship between queue manager QMGR1 and shared queue SHARED.QUEUE1. Further, the MQ module 118 may determine that there is a shared queue to CF structure relationship between shared queue SHARED.QUEUE1 and CF structure CFSTRUCT01. The MQ module 118 may also determine that there is a queue manager to shared queue relationship between queue manager QMGR1 and shared queue SHARED.QUEUE2. Moreover, the MQ module 118 may determine that there is a shared queue to CF structure relationship between shared queue SHARED.QUEUE1 and CF structure CFSTRUCT01.

The procedure continues to step 525 and the MQ module 118 generates, for inclusion on an interactive directed graph representing the MQ environment, a node for each identified object and an edge for each identified relationship. In this example, the MQ module 118 may generate a node for each of queue manager QMGR1, shared queue SHARED.QUEUE1, shared queue SHARED.QUEUE2, and CF structure CFSTRUCT01. Additionally, the MQ module 118 may generate an edge for each of the relationships as described above. The MQ module 118 may generate the nodes and edges in a similar manner as described above in relation to step 220 of FIG. 2.

In this example, let it be assumed that the MQ module 118 generates a square, i.e., cube, as the graphical depiction for the queue manager QMGR1. Additionally, let it be assumed that the MQ module 118 generates a circle as the graphical depiction for each of shared queue SHARED.QUEUE1, shared queue SHARED.QUEUE2, and CF structure CFSTRUCT01. The MQ module 118 may generate an edge with an arrow for the graphical depiction of the determined relationships as described above. In an embodiment, the arrow may indicate the flow of data (e.g., messages).

The procedure continues to step 530 and the MQ module includes the generated nodes and edges on an interactive directed graph to visually represent the queue manager, the shared queues, the CF structure, and their relationships on the interactive directed graph representing MQ environment. At step 530 the MQ module 118 may, as described in relation to step 225 of FIG. 2, implement one or more different graph algorithms to determine a location, on the interactive directed graph, for each of the generated nodes and edges on the interactive directed graph. It should be noted that an edge is not provided between the two shared queues because there is not a direct relationship (e.g., connection) between the two shared queues. The procedure then ends at step 535.

Figure 7:
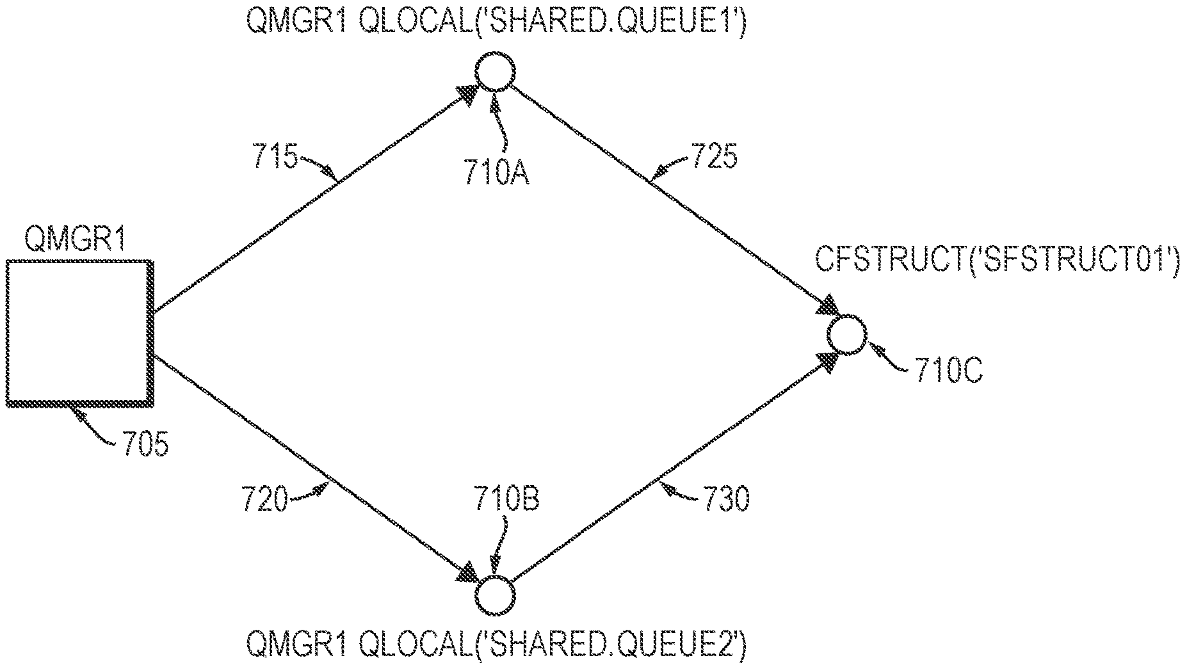
FIG. 7 is an illustration of an example interactive directed graph that can be generated from text file of FIG. 6 according to the one or more embodiments as described herein.

FIG. 7 is an illustration of an example interactive directed graph 700 that can be generated from text file 600 of FIG. 6 according to the one or more embodiments as described herein. The interactive directed graph 700 may be generated by the MQ module 118 based on the analysis of text file 600 as described above.

Interactive directed graph 700 includes node 705 that is a square/cube that is generated by MQ module 118 to represent queue manager QMGR1. Additionally, interactive directed graph 700 includes nodes 710A, 710B, and 710C that are circles and represent shared queue SHARED.QUEUE1, shared queue SHARED.QUEUE2, and CF structure CFSTRUCT01, respectively.

Further, interactive directed graph 700 includes edge 715 with an arrow that represents the relationship and flow of data from queue manager QMGR1 to shared queue SHARED.QUEUE1. Specifically, edge 715 with an arrow extends from node 705 that represents queue manager QMGR1 to node 710A that represents shared queue SHARED.QUEUE1. Interactive directed graph 700 also includes edge 720 with an arrow that represents the relationship and flow of data from queue manager QMGR1 to shared queue SHARED.QUEUE2. Specifically, edge 720 with an arrow extends from node 705 that represents queue manager QMGR1 to node 710B that represents shared queue SHARED.QUEUE2.

Further, interactive directed graph 700 includes edge 725 with an arrow that represents the relationship and flow of data from shared queue SHARED.QUEUE1 to CF structure CFSTRUCT01. Specifically, edge 725 with an arrow extends from node 710A representing shared queue SHARED.QUEUE1 to node 710C representing CF structure CFSTRUCT01. Moreover, interactive directed graph 700 includes edge 730 with an arrow that represents the relationship and flow of data from shared queue SHARED.QUEUE2 to CF structure CFSTRUCT01. Specifically, edge 730 with an arrow extends from node 710B representing shared queue SHARED.QUEUE2 to node 710C representing CF structure CFSTRUCT01.

Interactive directed graph 700 may further include a label, e.g., identifier, for each generated node in a similar manner as described above in relation to interactive directed graph 400.

FIG. 8 is a flow diagram of a sequence of steps for generating, for an interactive directed graph, nodes and edges for a point-to-point channel of an MQ environment according to the one or more embodiments as described herein. As will described in further detail below, the identification of a point-to-point channel of an MQ environment requires an analysis of text files corresponding to two different queue managers.

Figure 9A:
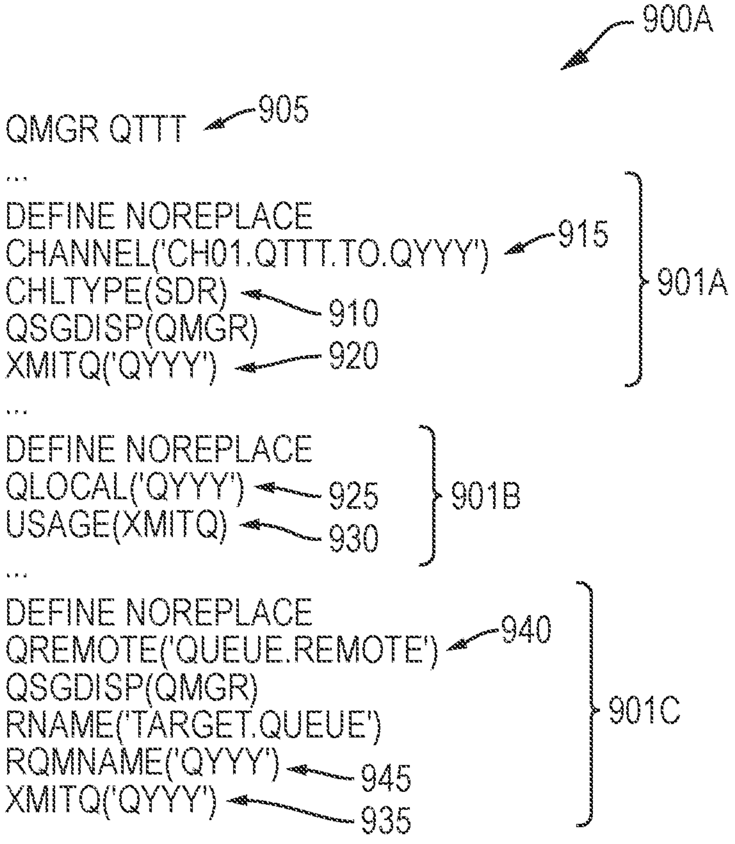
FIG. 9A is an illustration of an example text file for a queue manager of a point-to-point channel according to the one or more embodiments as described herein.

The procedure 800 starts at step 805 and continues to step 810 where the MQ module 118 identifies a queue manager from one or more definition objects of an MQ environment. FIG. 9A is an illustration of an example text file 900A for a queue manager of a point-to-point channel according to the one or more embodiments as described herein. The MQ module 118 may identify queue manager QTTT at line 905 of text file 900A in a similar manner as described above in relation to step 210 of FIG. 2.

Text file 900A may include definition objects 901A, 901B, and 901C. Definition object 901A may correspond to a sender channel managed by queue manager QTTT. Definition object 901B may correspond to a local queue managed by queue manager QTTT. Definition object 901C may correspond to a remote queue managed by queue manager QTTT.

The procedure continues to step 815 and the MQ module 118 identifies a sender channel from the text file. A sender channel may be a message channel that a queue manager (e.g., queue manager QTTT) uses to send messages to one or more other queue managers. In an embodiment, the MQ module 118 may identify a particular parameter field that identifies a sender channel that has a relationship to the identified queue manager. In an embodiment, the parameter field that identifies a sender channel is CHLTYPE (SDR). Therefore, the MQ module 118 may syntactically analyze definition object 901A of text file 900A to identify CHLTYPE (SDR) parameter field at line 910. The MQ module 118 may also syntactically analyze definition object 901A to identify parameter field CHANNEL ('CH01.QTTT.TO.QYYY') at line 915 to determine that CH01.QTTT.TO.QYYY is the identifier for the sender channel identified at line 910. As such, the MQ module 118 may determine that queue manager QTTT manages sender channel CH01.QTTT.TO.QYYY.

The procedure continues to step 820 and the MQ module 118 identifies a transmission queue corresponding to the identified sender channel. A transmission queue may be a local queue that is used when a queue manager (e.g., queue manager QTTT) forwards messages to a remote queue manager through a message channel (e.g., sender channel CH01.QTTT.TO.QYYY). In an embodiment, the MQ module 118 may identify a particular parameter field that identifies a transmission queue. In an embodiment, the parameter field that identifies a transmission queue is XMITQ. Therefore, the MQ module 118 may syntactically analyze definition object 901B of text file 900A to identify XMITQ parameter field at line 920. The MQ module 118 may syntactically identify QYYY that follows parameter field XMITQ and that is also enclosed in parentheses and single quotations at line 920. Based on the identification of QYYY in relation to parameter field XMITQ at line 920, the MQ module 118 may determine that the identifier of the transmission queue, corresponding to the identified sender channel at line 910, is QYYY. Therefore, and in this example, the MQ module 118 determines that a transmission queue QYYY is paired to sender channel CH01.QTTT.TO.QYYY for message transmission from queue manager QTTT to one or more destinations.

The procedure may continue to step 825 and the MQ module 118 may use the identifier for the transmission queue to identify a local queue with the same identifier. In this example, the identifier of the transmission queue is QYYY. As such, the MQ module 118 may identify a local queue that is identified by QYYY. As mentioned above, the parameter field QLOCAL may identify a local queue. As such, the MQ module 118 may identify parameter field QLOCAL ('QYYY') at line 925 in definition object 901B. Parameter field USAGE (XMITQ) at line 930 of definition object 901B may indicate to MQ module 118 that transmission queue QYYY is to be used for transmission only for point-to-point channels. Therefore, the MQ module 118 can validate that there exists a transmission queue QYYY for the sender channel CH01.QTTT.TO.QYYY.

The procedure continues to step 830 and the MQ module 118 identifies a remote queue that matches the transmission queue identifier. In this example, the remote queue is owned/managed by queue manager QTTT and remote to a different queue manager (e.g., queue manager QYYY as will be described later). In this example, the transmission queue identifier is QYYY. As such, the MQ module 118 may identify, in one or more definition objects corresponding to queue manager QTTT, a remote queue with a matching transmission queue, e.g., transmission queue QYYY.

Therefore, the MQ module 118 may identify XMITQ ('QYYY') at line 935 of definition object 901C that corresponds to a remote queue. The MQ module 118 may identify a particular parameter field that identifies a remote queue in definition object 901C. In an embodiment, the parameter field that identifies a remote queue is QREMOTE. Therefore, the MQ module 118 may syntactically identify QREMOTE parameter field at line 940 of definition object 901C. As such, the MQ module 118 may determine that the remote queue of definition object 901C matches the transmission queue identifier of QYYY.

The MQ module 118 may syntactically identify QUEUE.REMOTE that follows parameter field QREMOTE and that is also enclosed in parentheses and single quotations at line 940. Based on the identification of QUEUE.REMOTE in relation to parameter field QREMOTE at line 940, the MQ module 118 may determine that the identifier of the remote queue, managed by queue manager QTTT and referencing transmission queue QYYY, is QUEUE.REMOTE. Remote queue QUEUE.REMOTE is remote to an application that may, for example, have access to a different queue manager (e.g., different from queue manager QTTT) that is located at a receiving end for message communication.

Therefore, and based on the analysis of the text file 900A for queue manager QTTT, the MQ module 118 may determine that there is a queue manager to remote queue relationship between queue manager QTTT and remote queue QUEUE.REMOTE. Based on the analysis of the text file 900A, the MQ module 118 may also determine that there is a remote queue to local queue relationship between remote queue QUEUE.REMOTE and local queue QYYY. Based on the analysis of the text file 900A, the MQ module 118 may determine that there is a local queue to sender channel relationship between local queue QYYY and sender channel CH01.QTTT.TO.QYYY. Stated a different way, the analysis of text file 900A allows the MQ module 118 to determine that communication message transmit from queue manager QTTT to remote queue QUEUE.REMOTE, from remote queue QUEUE.REMOTE to local queue QYYY, and from local queue QYYY to sender channel CH01.QTTT.TO.QYYY The procedure continues to step 835 and the MQ module 118 identifies a different queue manager with definition objects for a matching receiver channel and local queue for the point-to-point channel. In definition object 901C for remote queue QUEUE.REMOTE, parameter field RQMNAME at line 945 may provide the identifier (i.e., name) of the remote queue manager of the point-to-point-channel. In this example, the identifier that follows RQMNAME at line 945 is QYYY. Therefore, the MQ module 118 may determine that the remote queue manager identifier is QYYY for the point-to-point channel.

Figure 9B:
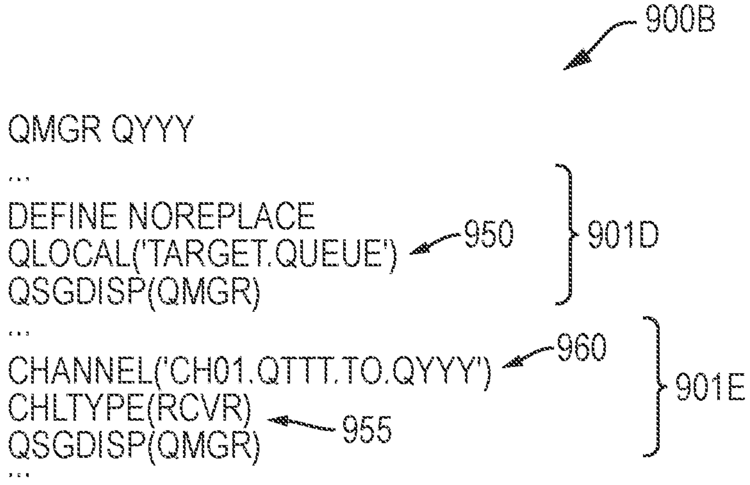
FIG. 9B is an illustration of an example text file for a remote queue manager of the point-to-point channel according to the one or more embodiments as described herein.

Therefore, the MQ module 118 may analyze the definition objects for queue manager QYYY to identify the matching receiver channel and local queue. FIG. 9B is an illustration of an example text file 900B for a remote queue manager (e.g., QYYY) of the point-to-point channel according to the one or more embodiments as described herein. Text file 900B includes definition objects 901D and 901E. Definition object 901D corresponds to a local queue managed by remote queue manager QYYY and definition object 901C corresponds to a receiver channel managed by remote queue manager QYYY.

The MQ module 118 may analyze text file 900B to syntactically identify a matching local queue and receiver channel. Specifically, the MQ module 118 may syntactically identify QLOCAL ('TARGET.QUEUE') at line 950 of definition object 901D to determine that the local queue TARGET.QUEUE is the local queue managed by the remote queue manager QYYY and used for the point-to-point channel. Additionally, the MQ module 118 may syntactically identify CHLTYPE (RCVR) and CHANNEL ('CH01.QTTT.TO.QYYY') at lines 955 and 960, respectively, of definition object 901E. Based on the syntactically identification, the MQ module 118 may determine that receiver channel CH01.QTTT.TO.QYYY is the receiving channel managed by remote queue manager QYYY and used for the point-to-point channel.

Therefore, and based on the analysis of the text file 900B for remote queue manager QYYY, the MQ module 118 may determine that there is a queue manager to local queue relationship between queue manager QYYY and local queue TARGET.QUEUE. Based on the analysis of the text file 900B, the MQ module 118 may also determine that there is a local queue to receiver channel relationship between local queue TARGET.QUEUE and receiver channel CH01.QTTT.TO.QYYY. Stated a different way, the analysis of text file 900B allows the MQ module 118 to determine that communication messages transmit over the point-to-point channel from receiver channel CH01.QTTT.TO.QYYY to local queue TARGET.QUEUE and from local queue TARGET.QUEUE to remote queue manager QYYY.

Accordingly, and based on the analysis of text files 900A and 900B, which are associated with two different queue managers QTTT and QYYY, the MQ module 118 can determine the direction of the data flow over the point-to-point channel between queue managers QTTT and QYYY.

The procedure continues to step 840 and the MQ module 118 generates, for inclusion on an interactive directed graph representing the MQ environment, a node for each identified MQ object and an edge for each identified relationship of the point-to-point channel. In this example, the MQ module 118 may generate a node for each of queue manager QTTT, remote queue QUEUE.REMOTE, local queue QYYY, sender channel CH01.QTTT.TO.QYYY, receiver channel CH01.QTTT.TO.QYYY, local queue TARGET.QUEUE, and remote queue manager QYYY. Additionally, the MQ module 118 may generate an edge for each of the relationships as described above. The MQ module 118 may generate the nodes and edges in a similar manner as described above in relation to step 220 of FIG. 2.

The procedure continues to step 845 and the MQ module 118 includes the generated nodes and edges on an interactive directed graph to visually represent the point-to-point channel on the interactive directed graph representing MQ environment. At step 845 the MQ module 118 may, as described in relation to step 225 of FIG. 2, implement one or more different graph algorithms to determine a location, on the interactive directed graph, for each of the generated nodes and edges on the interactive directed graph. The procedure then ends at step 850.

Figure 10:
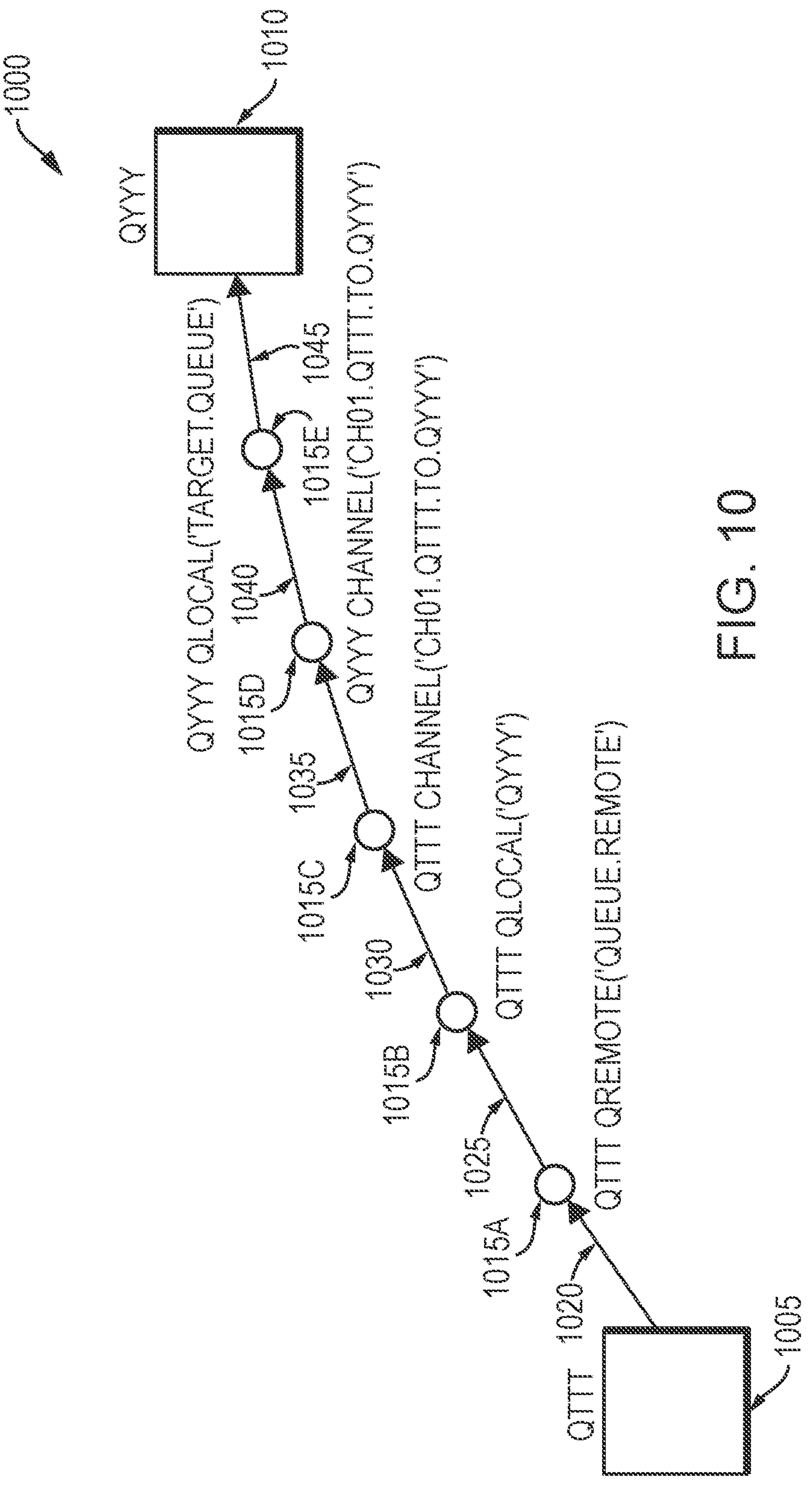
FIG. 10 is an illustration of an example interactive directed graph that can be generated from text files of FIGS. 9A and 9B according to the one or more embodiments as described herein.

FIG. 10 is an illustration of an example interactive directed graph 1000 that can be generated from text files 900A and 900B for queue managers QTTT and QYYY according to the one or more embodiments as described herein. The interactive directed graph 1000 may be generated by the MQ module 118 based on the analysis of text files 900A and 900B as described above.

Interactive directed graph 1000 includes node 1005 that is a square/cube that is generated by MQ module 118 to represent queue manager QTTT. Additionally, interactive directed graph 1000 includes node 1010 that is a square/cube that is generated by MQ module 118 to represent queue manager, e.g., remote queue manager, QYYY. Interactive directed graph also includes nodes 1015A, 1015B, 1015C, 1015D, and 1015E that are circles and represent remote queue QUEUE.REMOTE, local queue QYYY, sender channel CH01.QTTT.TO.QYYY, receiver channel CH01.QTTT.TO.QYYY, and local queue TARGET.QUEUE.

Further, interactive directed graph 1010 includes edge 1020 with an arrow that represents the relationship and flow of data from queue manager QTTT to remote queue QUEUE.REMOTE. Specifically, edge 1020 with an arrow extends from node 1005 that represents queue manager QYTTT to node 1015A that represents remote queue QUEUE.REMOTE. Interactive directed graph 1000 also includes edge 1025 with an arrow that represents the relationship and flow of data from remote queue QUEUE.REMOTE to local queue QYYY. Specifically, edge 1025 with an arrow extends from node 1015A that represents remote queue QUEUE.REMOTE to node 1015B that represents local queue QYYY.

Interactive directed graph 1000 also includes edge 1030 with an arrow that represents the relationship and flow of data from local queue QYYY to sender channel CH01.QTTT.TO.QYYY. Specifically, edge 1030 with an arrow extends from node 1015B that represents local queue QYYY to node 1015C that represents sender channel CH01.QTTT.TO.QYYY.

Interactive directed graph 1000 also includes edge 1035 with an arrow that represents the relationship and flow of data from sender channel CH01.QTTT.TO.QYYY to receiver channel CH01.QTTT.TO.QYYY. Specifically, edge 1035 with an arrow extends from node 1015C that represents sender channel CH01.QTTT.TO.QYYY to node 1015D that represents receiver channel CH01.QTTT.TO.QYYY.

Interactive directed graph 1000 also includes edge 1040 with an arrow that represents the relationship and flow of data from receiver channel CH01.QTTT.TO.QYYY to local queue TARGET.QUEUE. Specifically, edge 1040 with an arrow extends from node 1015D that represents receiver channel CH01.QTTT.TO.QYYY to node 1015E that represents local queue TARGET.QUEUE.

Interactive directed graph 1000 also includes edge 1045 with an arrow that represents the relationship and flow of data from local queue TARGET.QUEUE to queue manager QYYY. Specifically, edge 1045 with an arrow extends from node 1015E that represents local queue TARGET.QUEUE to node 1010 that represents queue manager QYYY. The interactive directed graph 1000 may also include labels as described above with reference to FIGS. 4 and 7.

As described above in relation to FIGS. 2 through 10, the MQ module 118 may analyze the different text files that are generated for the manager queues of the MQ environment to determine which objects are managed by each queue manager. The analysis, according to the one or more embodiments as described herein, allows the MQ module 118 to determine the relationships between the queue managers and objects managed by the queue managers to understand how data is transmitted (e.g., sent and received) through the MQ environment. The MQ module 118 can generate an interactive directed graph representing the entire MQ environment using graphical nodes and edges that are interconnected to represent the relationships between the objects of the MQ environment and the manner in which data is transmitted through the MQ environment.

Although the description of FIGS. 2 through 10 relate to particular types of MQ objects, it is expressly contemplated that the one or more embodiments as described herein may generate an interactive directed graph for other types of MQ objects in a similar manner.

For example, the one or more embodiments as described herein may identify alias queues managed by queue managers, clusters (e.g., a network of queue managers) of an MQ environment, etc. For example, and to generate an interactive directed graph of a cluster in a similar manner as described above, the MQ module 118 may analyze text files corresponding to queue managers to identify queue managers, a cluster transmit queue, a cluster sender channel, a cluster receiver channel, and a CLUSTER parameter field. The interactive directed graph for the cluster may include a graphical depiction for the cluster hub in addition to graphical depictions for queue managers, queues, and channels as described above.

As such, the examples as described herein are for illustrative purposes only and it is expressly contemplated that the MQ module 118 may generate an interactive directive graph for an MQ environment that includes any of a variety of different MQ object types in a similar manner as described herein.

Figure 11:
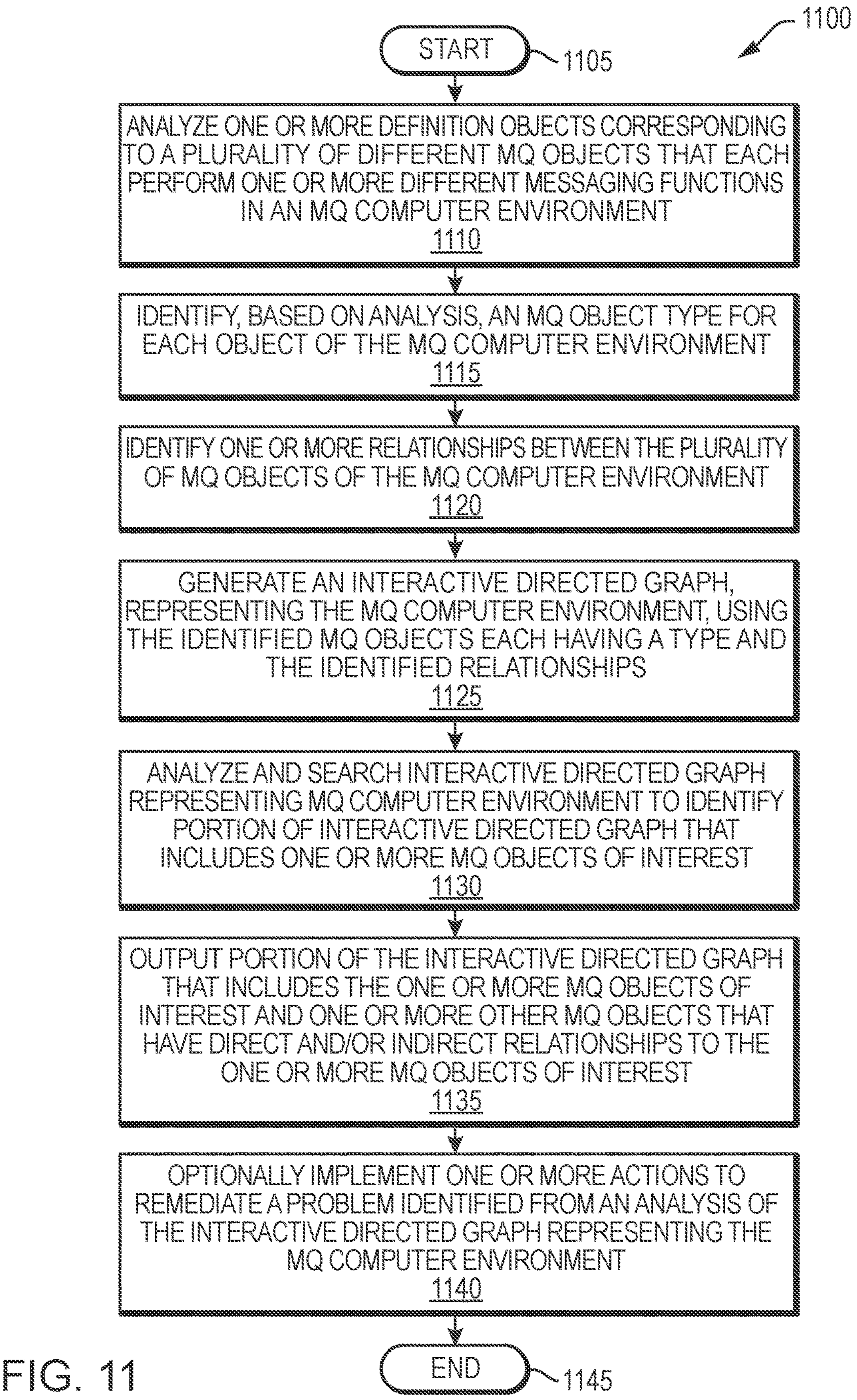
FIG. 11 is a flow diagram of a sequence of steps for generating an interactive directed graph, representing an MQ computer environment, with graphical nodes and edges representing the objects of the MQ environment and their relationships according to the one or more embodiments as described herein.

FIG. 11 is a flow diagram of a sequence of steps for generating an interactive directed graph, representing an MQ computer environment, with graphical nodes and edges representing the objects of the MQ environment and their relationships according to the one or more embodiments as described herein.

Procedure 1100 starts at step 1105 and continues to step 1110 where the MQ module 118 analyzes one or more definition objects corresponding to a plurality of different MQ objects that each perform one or more different messaging functions in an MQ computer environment. For example, the MQ module 118 may analyze each text file, which includes one or more definition objects, which is generated for each queue manager of the MQ environment. For example, the MQ module 118 may analyze text file 300 that is generated for a queue manager of the MQ environment. The MQ module may analyze all other text files that are generated for the MQ environment.

Based on the analysis, the procedure continues to step 1115, and the MQ module 118 identifies an MQ object type for each object of the MQ computer environment. For example, and as described above in relation to FIGS. 2 and 3, the MQ module 118 may analyze text file 300 and identify a queue manager object type (e.g., queue manager QMGR2), a server connection channel object type (e.g., server connection channel CL01.SVRCONN and server connection channel CL02.SVRCONN), and a non-shared queue object type (e.g., non-shared queue LOCAL.QUEUE1.NOTSHARED).

The MQ module 118 may perform a similar analysis and determination for all the text files generated for the entire MQ environment such that the MQ module 118 can identify all, e.g., plurality, of the MQ objects of the MQ environment and the type of each of the identified MQ objects of the MQ environment.

The procedure continues to step 1120 and the MQ module 118 identifies one or more relationships between the plurality of MQ objects of the MQ environment. Continuing with the example of FIGS. 2 and 3, the MQ module 118 can determine that a queue manager to local queue relationship (e.g., connection) exists between queue manager QMGR2 and local queue LOCAL.QUEUE1.NOTSHARED. As another example, and in relation to FIGS. 5 and 6, the MQ module 118 can determine that a shared queue to CF structure relationship (e.g., connection) exists between shared queue SHARED.QUEUE1 and CF structure CFSTRUCT01. The MQ module 118 can also determine that there is not a queue manager to CF structure direct relationship (e.g., direct connection) between queue manager QMGR1 and CF structure CFSTRUCT01. However, there is an indirect queue manager to CF structure relationship (e.g., indirect connection) between queue manager QMGR1 and CF structure CFSTRUCT01 by way of shared queues SHARED.QUEUE1 and SHARED.QUEUE2. In an embodiment, the MQ module 118 may similarly identify all the relationships for all MQ objects of the MQ computer environment.

The procedure continues to step 1125 and the MQ module 118 generates an interactive directed graph, representing the MQ computer environment, using the identified MQ objects each having a type and the identified relationships. In an embodiment, the MQ module 118 may generate a graphical node for each identified object. The MQ module 118 may generate a different graphical depiction for each MQ object type or may generate a same graphical depiction for two or more MQ object types. For example, the MQ module 118 may generate a square/cube for each queue manager identified in the MQ computer environment. As another example, the MQ module 118 may generate a circle for server connection channels, local queues (e.g., shared and non-shared queue), etc. Further, the MQ module 118 may generate a triangle for a cluster hub. Therefore, it is expressly contemplated that the MQ module 118 may generate any type of graphical depiction to represent any of a variety of different types of MQ objects in the MQ computer environment.

Additionally, the MQ module 118 may generate an edge for each relationship identified between MQ objects of the MQ computer environment. In an embodiment, the edge may include an arrow to indicate a direction flow of messages. Therefore, the MQ module 118 may generate a different node for each MQ object identified from the analysis of the text files corresponding to the MQ computer environment. The MQ module 118 may also generate a different edge for each relationship (e.g., direct relationship) identified from the analysis of the text files corresponding to the MQ computer environment.

In an embodiment, generating the interactive directed graph may include the QM module 118 determining a location for each node and each edge on the interactive determined based on the plurality of different MQ objects in the MQ computer environment and the identified relationships.

In an embodiment, the MQ module 118 may utilize a graph algorithm to determine the locations on the interactive directed graph. The graph algorithm may utilize a plurality of different criteria for determining a location for each of the generated nodes and edges on the interactive directed graph. The criteria may include, but is not limited to, the size of each of the generated graphical nodes, the number of the generated graphical nodes, the size and/or number of the existing generated graphical nodes and/or edges on the interactive directed graph, a size of the overall interactive directed graph when maximized and/or minimized on a computer display, spatial requirements between nodes and/or edges on the interactive directed graph, etc. In an embodiment, the MQ module 118 may implement NetworkX, a package for the Python program language, as the graph algorithm to determine a location for each generated node and edge.

Therefore, the MQ module 118 can generate an interactive directed graph of an entire MQ environment. Specifically, the MQ module 118 can generate the interactive directed graph to include nodes for all MQ objects in the MQ environment and edges for all relationships between the MQ objects in the MQ environment. Therefore, the interactive directed graph, generated according to the one or more embodiments as described herein, provides a complete pictorial representation of the MQ environment and the manner in which data flows through the MQ environment.

The interactive directed graphs of FIGS. 4, 7, and 10 are simplistic representation for ease of understanding. However, real-world MQ environments are much more complex and include many more objects than those depicted in FIGS. 4, 7, and 10. For example, a real-world MQ environment may include hundreds if not thousands of MQ objects that perform messaging functions in the MQ computer environment. Therefore, the interactive directed graphs for real-world MQ environments that are generated according to the one or more embodiments as described herein may include thousands of nodes and edges.

Because the visual representation of a real-world MQ environment may be complex and densely populated with nodes and edges, the interactive directed graph according to the one or more embodiments as described herein can be manipulated and searched to focus on a portion of interest. For example, the portion of interest of the MQ environment may be investigated to identify a location and/or objects in the MQ computer environment that have caused or are related to a disruption in service (e.g., errors, messages not being transmitted, bottleneck traffic, etc.). Therefore, the interactive directed graph of the MQ environment may be used and analyzed to take one or more actions to avoid or remediate a disruption in service in the MQ computer environment.

Referring back to FIG. 11, the procedure continues from step 1125 to step 1130 and the MQ module 118 analyzes and searches the interactive directed graph representing the MQ computer environment to identify a portion of the interactive directed graph that includes one or more MQ objects of interest.

In an embodiment, the interactive directed graph may be automatically analyzed and searched by the MQ module 118. For example, MQ module 118 may receive real-world data regarding the operation of the MQ environment at one or more predetermined time intervals (e.g., every day). The MQ module 118 may automatically analyze that data and extract one or more identifiers corresponding to one or more MQ objects of interest in the MQ computer environment.

For example, the MQ module 118 may obtain/receive email communications between authorized personnel of the enterprise regarding a disruption of service corresponding to a particular queue having a particular queue name (e.g., QLOCAL.APP1). The MQ module 118 may extract the queue name/identifier of local queue QLOCAL.APP1 and search the interactive directed graph representing the MQ environment to determine the node corresponding to the local queue QLOCAL.APP1 in the interactive directed graph. Specifically, the MQ module 118 may analyze the interactive directed graph to identify the node (e.g., circle) in the interactive directed graph that has the label/identifier of QLOCAL.APP1.

Instead of the MQ module 118 automatically analyzing the interactive directed graph based on the analysis of real-world data, it is expressly contemplated that the interactive directed graph may be analyzed based on user input. For example, authorized personnel of the enterprise may utilize client device 110 to provide, via a user interface, the local queue identifier of QLOCAL.APP1. Specifically, the authorized personnel may know that local queue QLOCAL.APP1 is problematic, but because of the complexity of the MQ environment, the authorized personnel does not know where in the MQ environment local queue QLOCAL.APP1 is located and what other MQ objects are directly and/or indirectly affected by the problem encountered by local queue QLOCAL.APP1. Therefore, authorized personnel may provide the identifier of QLOCAL.APP1 to the MQ module 118, via a user interface, to identify the node corresponding to local queue QLOCAL.APP1 and to identify the other MQ objects that are directly and/or indirectly connected (e.g., affected) to local queue QLOCAL.APP1.

The procedure continues to step 1135 and the MQ module 118 may output a portion of the interactive directed graph that includes the one or more MQ objects of interest and one or more other MQ objects that have direct and/or indirect relationships to the one or more MQ objects of interest.

Figure 12:
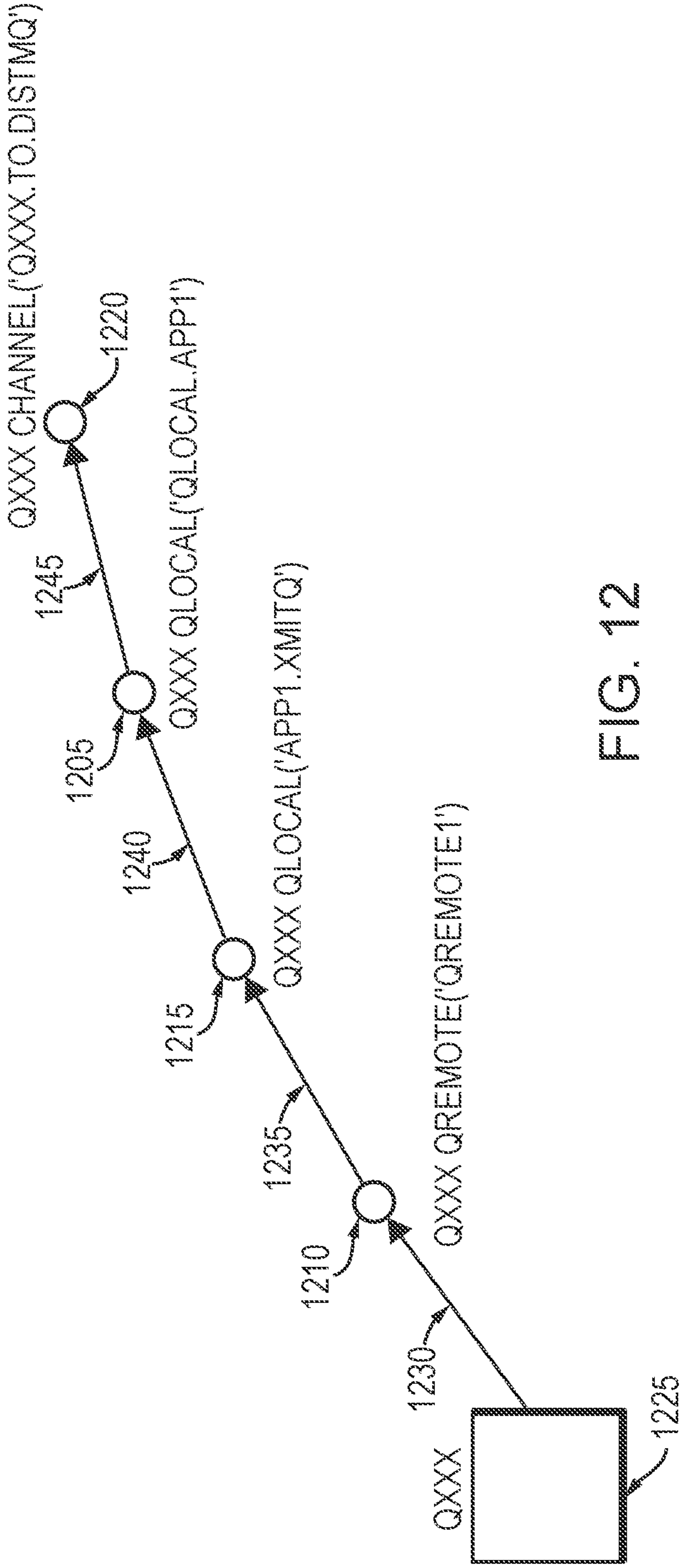
FIG. 12 is a portion of an interactive directed graph that is identified to include one or more MQ objects of interest, e.g., local queue QLOCAL.APP1, according to the one or more embodiments as described herein.

FIG. 12 is a portion 1200 of an interactive directed graph (hereinafter "portion of graph 1200") that is identified to include one or more MQ objects of interest, e.g., local queue QLOCAL.APP1, according to the one or more embodiments as described herein. In an embodiment, the MQ module 118 may provide the portion of the interactive directed graph 1200 for display on client device 110 such that authorized personnel can view and evaluate the one or more MQ objects of interest and their relationships to other MQ objects that are closely related to the one or more MQ objects of interest.

In the example of FIG. 12, the MQ object of interest is local queue QLOCAL.APP1 that is represented by node (e.g., circle) 1205 on portion of graph 1200 that represents a portion of an MQ computer environment. FIG. 12 also includes nodes 1210, 1215, and 1220 that are circles and represent remote queue QREMOTE1, transmission queue APP1.XMITQ, and channel QXXX.TO.DISTMQ, respectively. Moreover, FIG. 12 includes node 1225 (e.g., square) for queue manager QXXX. Each of remote queue QREMOTE1, transmission queue APP1.XMITQ, channel QXXX.TO.DISTMQ, and queue manager QXXX have a close relationship (e.g., direct relationship or indirect relationship) with local queue QLOCAL.APP1 that is the MQ object of interest. The interactive directed graph 1200 further includes edges 1230, 1235, 1240, and 1245 with arrows to indicate the flow of data and relationships between the MQ objects represented by the nodes.

Therefore, only the QM object of interest must be provided (e.g., by the authorized personnel or obtained automatically by the MQ module 118) to generate the portion of graph 1200. From the portion of graph 1200, authorized personnel can determine that local queue QLOCAL.APP1, which is the object of interest, is managed by queue manager QXXX. Additionally, authorized personnel can determine that local queue QLOCAL.APP1, which is the object of interest, is connected via a remote queue and on a channel to another queue manager on a distributed box. As such, the portion of graph 1200 allows the user to see and understand what object is managing the object of interest that encountered a problem and the downstream and upstream objects that may be affected by the problem. Therefore, the display and then analysis of the portion of graph 1200 allows authorized personnel to practically implement (i.e., practical application) one or more actions to remediate the identified problem.

The MQ module 118 may also determine this information by automatically analyzing the portion of graph 1200 and, specifically, the nodes and edges included in the portion of graph 1200.

The information provided by the portion of graph 1200 can be utilized to diagnose and/or remediate a problem (e.g., bottleneck traffic, etc.) in the MQ computer environment. The procedure of FIG. 11 optionally continues to step 1140 and the MQ module 118 implements one or more actions to remediate a problem identified from an analysis of the interactive directed graph representing the MQ computer environment.

In an embodiment, the MQ module 118 may automatically implement one or more actions, based on the analysis of graph 1200, to remediate the identified problem. For example, the MQ module 118 may determine that channel QXXX.TO.DISTMQ has the wrong connection name such that messages are not arriving at the destination. As such, the MQ module 118 may automatically change the connection name to fix the problem. Alternatively, the one or more actions may be implemented by the MQ module 118 based on receiving one or more input commands via client device 110. For example, authorized personnel may provide one or more input commands, via client device 110 that may indicate one or more actions to be taken. The MQ module 118 may then implement the one or more actions. The procedure then ends at step 1145.

By generating and utilizing the interactive directed graph representing an MQ computer environment, the one or more embodiments as described herein can identify and remediate MQ problems more easily and efficiently when compared to conventional systems. Specifically, such conventional systems require users to manually investigate raw data that is a plain text format to understand the operation of the MQ environment such that problems can be identified and remediated. Such a manual process is tedious and error prone.

Because the interactive directed graph representing the MQ environment allows for the more effective and efficient identification and remediation of MQ problems when compared to conventional systems, the one or more embodiments as described herein result in a more stable MQ environment (e.g., less errors, bottlenecks, etc.) when compared to conventional systems. As such, the one or more embodiments as described herein provide an improvement in the existing and developing technological field of MQ computer environments that are used for computer application inter-communication.

As explained above, the one or more embodiments as described herein provide a more stable MQ environment when compared to conventional systems. A stable MQ environment uses less processing and storage resources when compared to conventional MQ systems that are more unstable and require additional processing and storage resources to handle errors, transmission problems, etc. Because the one or more embodiments as described herein result in a more stable MQ computer environment that uses less processing and storage resources, the one or more embodiments as described herein provide an improvement to a computer, (e.g., computer hosting the MQ environment), itself.

It should be understood that a wide variety of adaptations and modifications may be made to the techniques. For example, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computer implemented method for managing a messaging queue (MQ) computer environment, comprising:

analyzing one or more definition objects corresponding to a plurality of different MQ objects that each perform one or more different messaging functions in the MQ computer environment;

generating, based on the analysis, an interactive directed graph representing the MQ computer environment, wherein the interactive directed graph includes a node for each of the plurality of different MQ objects and one or more edges for relationships between the plurality of different MQ objects;

receiving an identifier of a particular MQ object of the plurality of different MQ objects;

identifying a particular node included in the interactive directed graph and corresponding to the identifier of the particular MQ object;

displaying, on a computer display, a portion of the interactive directed graph that includes only the particular node, one or more other nodes that are within a threshold distance to the particular node, and one or more particular edges that are connected to the particular node and the one or more other nodes; and automatically analyzing the portion of the interactive directed graph and automatically implementing one or more actions to the MQ computer environment to correct or avoid a disruption in messaging services in the MQ computer environment.

2. The computer implemented method of claim 1, wherein the particular MQ object is one of (1) a queue manager, (2) a non-shared queue, (3) a shared queue, (4) a coupling facility structure, (5) a point-to-point channel, (6) an alias queue, and (7) a cluster.

3. The computer implemented method of claim 1, wherein the one or more actions include correcting a connection name corresponding to a selected MQ object.

4. The computer implemented method of claim 1, further comprising:

receiving user input on the interactive directed graph;

displaying, on the computer display, one or more potential actions to be implemented for the MQ computer environment;

receiving a selection of at least one of the one or more potential actions displayed on the computer display; and implementing the at least one selected action for the MQ computer environment to rectify a disruption in services in the MQ computer environment.

5. The computer implemented method of claim 1, further comprising:

identifying, in a selected data structure generated by a selected queue manager, a local queue identifier corresponding to a selected MQ object;

determining, in response to identifying the local queue identifier, that the selected MQ object is a local queue object type;

generating (1) a first node on the interactive directed graph for the selected MQ object that is the local queue object type, (2) a second node on the interactive directed graph for the selected queue manager, and (3) one or more selected edges between the first node and the second node.

6. A system for managing a messaging queue computer environment (MQ), the system comprising:

a memory; and a processor coupled to the memory, the processor configured to:

analyze one or more definition objects corresponding to a plurality of different MQ objects that each perform one or more different messaging functions in the MQ computer environment;

generate, based on the analysis, an interactive directed graph representing the MQ computer environment, wherein the interactive directed graph includes a node for each of the plurality of different MQ objects and one or more edges for relationships between the plurality of different MQ objects;

receive an identifier of a particular MQ object of the plurality of different MQ objects;

identify a particular node included in the interactive directed graph and corresponding to the identifier of the particular MQ object;

display, on a computer display, a portion of the interactive directed graph that includes only the particular node, one or more other nodes that are within a threshold distance to the particular node, and one or more particular edges that are connected to the particular node and the one or more other nodes; and automatically analyze the portion of the interactive directed graph and automatically implement one or more actions to the MQ computer environment to correct or avoid a disruption in messaging services in the MQ computer environment.

7. The system of claim 6, wherein the particular MQ object is one of (1) a queue manager, (2) a non-shared queue, (3) a shared queue, (4) a coupling facility structure, (5) a point-to-point channel, (6) an alias queue, and (7) a cluster.

8. The system of claim 6, wherein the one or more actions include correcting a connection name corresponding to a selected MQ object.

9. The system of claim 6, wherein the processor is further configured to:

receive user input on the interactive directed graph;

display, on the computer display, one or more potential actions to be implemented for the MQ computer environment;

receive a selection of at least one of the one or more potential actions displayed on the computer display; and implement the at least one selected action for the MQ computer environment to rectify a disruption in services in the MQ computer environment.

10. The system of claim 6, wherein the processor is further configured to:

identify, in a selected data structure generated by a selected queue manager, a local queue identifier corresponding to a selected MQ object;

determine, in response to identifying the local queue identifier, that the selected MQ object is a local queue object type;

generate (1) a first node on the interactive directed graph for the selected MQ object that is the local queue object type, (2) a second node on the interactive directed graph for the selected queue manager, and (3) one or more selected edges between the first node and the second node.

11. A non-transitory computer readable medium having software encoded thereon, the software when executed by one or more computing devices operable to:

analyze one or more definition objects corresponding to a plurality of different messaging queue (MQ) objects that each perform one or more different messaging functions in an MQ computer environment;

generate, based on the analysis, an interactive directed graph representing the MQ computer environment, wherein the interactive directed graph includes a node for each of the plurality of different MQ objects and one or more edges for relationships between the plurality of different MQ objects;

receive an identifier of a particular MQ object of the plurality of different MQ objects;

identify a particular node included in the interactive directed graph and corresponding to the identifier of the particular MQ object;

display, on a computer display, a portion of the interactive directed graph that includes only the particular node, one or more other nodes that are within a threshold distance to the particular node, and one or more particular edges that are connected to the particular node and the one or more other nodes; and automatically analyze the portion of the interactive directed graph and automatically implement one or more actions to the MQ computer environment to correct or avoid a disruption in messaging services in the MQ computer environment.

12. The non-transitory computer readable medium of claim 11, wherein the particular MQ object is one of (1) a queue manager, (2) a non-shared queue, (3) a shared queue, (4) a coupling facility structure, (5) a point-to-point channel, (6) an alias queue, and (7) a cluster.

13. The non-transitory computer readable medium of claim 11, wherein the one or more actions include correcting a connection name corresponding to a selected MQ object.

14. The non-transitory computer readable medium of claim 11, the software when executed by the one or more computing devices further operable to:

receive user input on the interactive directed graph;

display, on the computer display, one or more potential actions to be implemented for the MQ computer environment;

receive a selection of at least one of the one or more potential actions displayed on the computer display; and implement the at least one selected action for the MQ computer environment to rectify a disruption in services in the MQ computer environment.

15. The non-transitory computer readable medium of claim 11, the software when executed by the one or more computing devices further operable to:

identify, in a selected data structure generated by a selected queue manager, a local queue identifier corresponding to a selected MQ object;

determine, in response to identifying the local queue identifier, that the selected MQ object is a local queue object type;

generate (1) a first node on the interactive directed graph for the selected MQ object that is the local queue object type, (2) a second node on the interactive directed graph for the selected queue manager, and (3) one or more selected edges between the first node and the second node.

* * * * *